United States Patent
Okabayashi et al.

(10) Patent No.: US 9,808,718 B2
(45) Date of Patent: Nov. 7, 2017

(54) SERVER SYSTEM AND METHOD FOR CONTROLLING COMPUTER SYSTEM

(71) Applicants: BANDAI NAMCO Games Inc., Tokyo (JP); DeNA Co., Ltd., Tokyo (JP)

(72) Inventors: Hideyuki Okabayashi, Tokyo (JP); Sokichi Shimooka, Tokyo (JP); Yuui Hishinuma, Tokyo (JP); Terukazu Kanematsu, Tokyo (JP); Yuya Katsutani, Tokyo (JP); Shinichirou Umetani, Musashino (JP); Yasumichi Onishi, Atsugi (JP); Atsushi Otani, Tokyo (JP)

(73) Assignees: BANDAI NAMCO Entertainment Inc., Tokyo (JP); DeNA Co., Ltd., Tokyo (JP)

( * ) Notice: Subject to any disclaimer, the term of this patent is extended or adjusted under 35 U.S.C. 154(b) by 418 days.

(21) Appl. No.: 14/499,468

(22) Filed: Sep. 29, 2014

(65) Prior Publication Data
US 2015/0072793 A1    Mar. 12, 2015

Related U.S. Application Data

(63) Continuation of application No. PCT/JP2013/059485, filed on Mar. 29, 2013.

(30) Foreign Application Priority Data

Mar. 30, 2012    (JP) .............................. 2012-080458

(51) Int. Cl.
*A63F 13/00*    (2014.01)
*A63F 13/69*    (2014.01)
(Continued)

(52) U.S. Cl.
CPC .............. *A63F 13/69* (2014.09); *A63F 13/35* (2014.09); *A63F 13/58* (2014.09);
(Continued)

(58) Field of Classification Search
CPC ................ G06F 15/16; A63F 2300/575; A63F 2300/609; A63F 2300/556; A63F 13/69; A63F 13/35; A63F 13/58
See application file for complete search history.

(56) References Cited

U.S. PATENT DOCUMENTS

2012/0011256 A1* 1/2012 Masuda ................. A63F 13/34
709/227

FOREIGN PATENT DOCUMENTS

| JP | 2003-181143 A |   | 7/2003 |
| JP | 2003181143 A  | * | 7/2003 |

(Continued)

OTHER PUBLICATIONS

Masatoshi Tokuoka, Social Game Gyokai Saishin Jijo, 1st edition, 1st print, Softbank Creative Corp., Apr. 1, 2011, pp. 9 to 13 and 27 to 35.
Monster Hunter Frontier Online Sakigake!! Skill Juku, LOGiN, Feb. 1, 2008, vol. 27, No. 2, whole No. 383, pp. 68 and 73.
(Continued)

*Primary Examiner* — Milap Shah
*Assistant Examiner* — Jeffrey Wong
(74) *Attorney, Agent, or Firm* — Posz Law Group, PLC

(57) ABSTRACT

A server system and the like allow the users who play asynchronous games to perceive each other's presence to prompt the users to communicate with each other and feel a sense of solidarity. When the progress of a first game played by one player has changed to be advantageous to the player due to the use of an AP recovery item or the like, a parameter in the first game is incremented (e.g., action points AP are recovered). A parameter in a second game played by a friend user of the player is also incremented (e.g., the action points
(Continued)

AP are recovered) through an extension control process. An activation notification W12 that notifies to that effect is displayed on a user terminal of the player who plays the first game.

13 Claims, 14 Drawing Sheets

(51) Int. Cl.
  *A63F 13/58*   (2014.01)
  *A63F 13/35*   (2014.01)
(52) U.S. Cl.
  CPC ... *A63F 2300/556* (2013.01); *A63F 2300/575* (2013.01); *A63F 2300/609* (2013.01)

(56) References Cited

FOREIGN PATENT DOCUMENTS

| | | |
|---|---|---|
| JP | 2010-233654 A | 10/2010 |
| JP | 2012-034325 A | 2/2012 |
| JP | 2012-050750 A | 3/2012 |
| JP | 2012050750 A * | 3/2012 |

OTHER PUBLICATIONS

International Search Report of the International Searching Authority dated Jul. 2, 2013 for the corresponding international application No. PCT/JP2013/059485.

* cited by examiner

FIG. 2
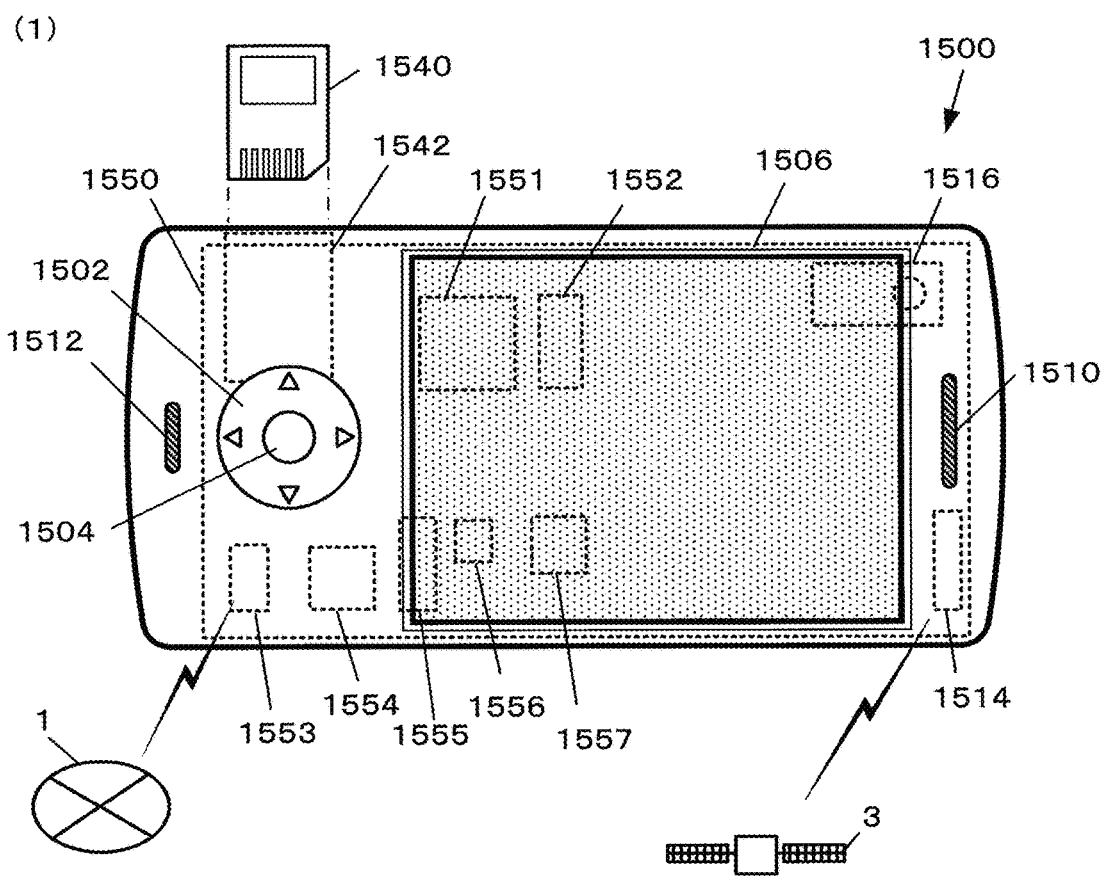
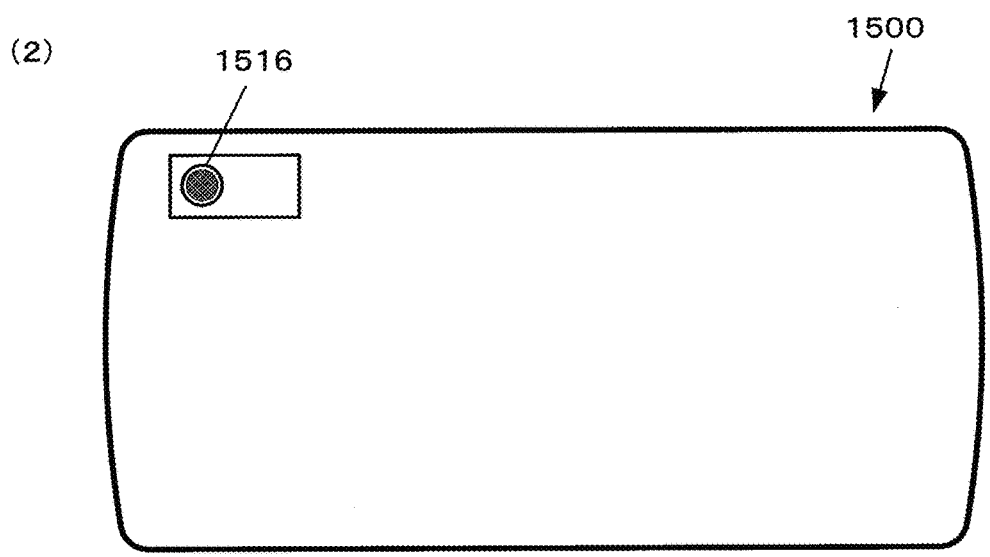

FIG. 6

| 525 FRIEND LIST | 525b | 525c | |
|---|---|---|---|
| 525a USER ACCOUNT | DEGREE OF FRIENDSHIP | CHAT HISTORY DATA | ... |
| KOBUTA | 75 | CHAT DATA 01 | ... |
| snow man Z | 12 | CHAT DATA 02 | ... |
| ⋮ | ⋮ | ⋮ | ⋮ |

FIG. 7

540 — PLAY DATA

541 — USER ACCOUNT | U1

542 — GAME ID | FIRST GAME

544 — REMAINING AP

546 — PLAYER LEVEL

548 — EXPERIENCE VALUE

550 — VIRTUAL MONEY BALANCE

552 — PLAY DATE/TIME HISTORY

554 — POSSESSED ITEM LIST

556 — CAPABILITY PARAMETER VALUE TABLE

| ATTACK CAPABILITY | 45 |
|---|---|
| DEFENSE CAPABILITY | 20 |
| HIT PROBABILITY | 30 |
| RECOVERY CAPABILITY | 10 |
| ⋮ | ⋮ |

⋮

SERVER SYSTEM AND METHOD FOR CONTROLLING COMPUTER SYSTEM

CROSS REFERENCE TO RELATED APPLICATION

This application is a continuation of International Patent Application No. PCT/JP2013/059485, having an international filing date of Mar. 29, 2013, which designated the United States, the entirety of which is incorporated herein by reference. Japanese Patent Application No. 2012-080458 filed on Mar. 30, 2012 is also incorporated herein by reference in its entirety.

BACKGROUND

A game is normally designed so that various parameters that describe the progress of the game are provided, and appropriately changed corresponding to the progress of the game. These parameters can basically be used only within the game, and are changed corresponding to only a change in situation within the game. For example, when the game is designed so that a parameter is changed when a specific item has been used, the effect thereof is limited to the range within the game (see JP-A-2010-233654, for example).

A community-type website (e.g., social networking service (SNS)) developed in recent years provides a plurality of games, and allows each user to select and play the desired game. Such a game is referred to as "SNS game", "social game", or the like. Each user plays the SNS game independently of each other in an asynchronous manner, differing from a multi-player online game and the like. The games are not linked to each other, and a change in parameter is limited to the range within each game.

However, the users who play the SNS game frequently communicate with each other, and discuss their experience and impressions regarding the game, techniques to play or clear the game, and the like. The users feel a sense of solidarity, and develop friendship with each other in the same manner as the players who play a multi-player online game. The users are motivated by each other through communication, and more interested in the SNS game.

SUMMARY

According to one aspect of the invention, there is provided a server system that asynchronously controls a process of a game played by each player, the server system comprising:

a parameter change control section that changes a parameter of a first player when a given activation condition has been satisfied, the activation condition being a condition whereby a process that changes the parameter of the first player is performed;

an extension control section that performs an extension control process that changes a parameter of a second player who relates to the first player when the second player has logged in after the activation condition has been satisfied; and a change width adjustment section that adjusts a change width of the parameter of the second player that is changed by the extension control process corresponding to an elapsed time until the second player logs in after the activation condition has been satisfied.

According to another aspect of the invention, there is provided a method for controlling a computer system that asynchronously controls a process of a game played by each player, the method comprising:

changing a parameter of a first player when a given activation condition has been satisfied, the activation condition being a condition whereby a process that changes the parameter of the first player is performed;

performing an extension control process that changes a parameter of a second player who relates to the first player when the second player has logged in after the activation condition has been satisfied; and adjusting a change width of the parameter of the second player that is changed by the extension control process corresponding to an elapsed time until the second player logs in after the activation condition has been satisfied.

BRIEF DESCRIPTION OF THE DRAWINGS

FIG. 2 is a view illustrating a configuration example of a user terminal.

FIG. 6 is a view illustrating an example of the data configuration of a friend list.

FIG. 7 is a view illustrating an example of the data configuration of play data.

DESCRIPTION OF EXEMPLARY EMBODIMENTS

Figure 1:
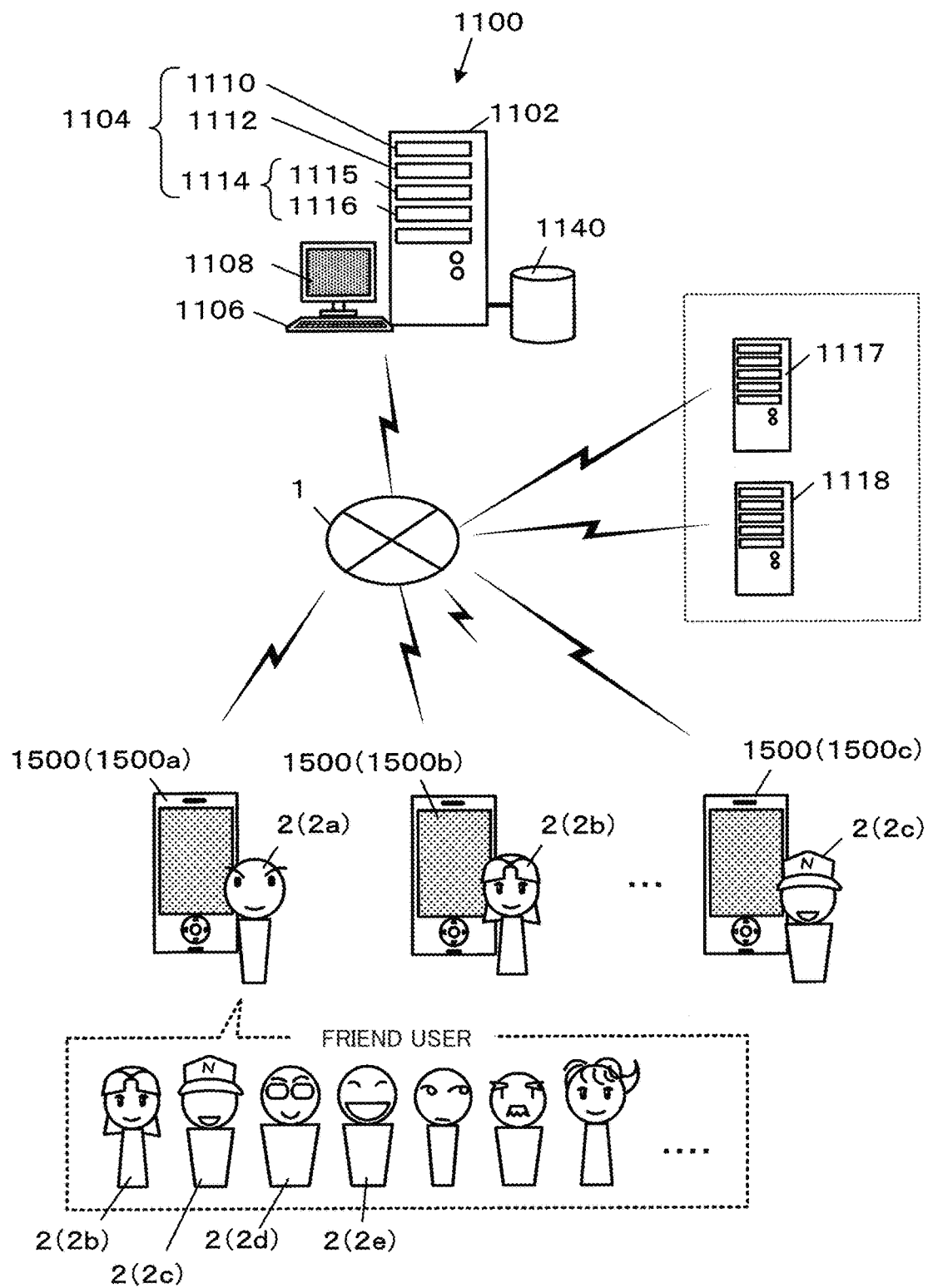
FIG. 1 is a view illustrating an example of the configuration of a game system according to a first embodiment.

Several embodiments of the invention may allow the users who play asynchronous games to perceive each other's presence to prompt the users to communicate with each other and feel a sense of solidarity.

According to one embodiment of the invention, a server system asynchronously controls a process of a game played by each player, and includes: a parameter change control section that changes a parameter of a first player when a given activation condition has been satisfied, the activation condition being a condition whereby a process that changes the parameter of the first player is performed; an extension control section that performs an extension control process that changes a parameter of a second player when the second player who relates to the first player has logged in after the activation condition has been satisfied; and a change width adjustment section that adjusts a change width of the parameter of the second player that is changed by the extension control process corresponding to an elapsed time until the second player logs in after the activation condition has been satisfied.

According to another embodiment of the invention, a method for controlling a server system that asynchronously controls a process of a game played by each player, includes: changing a parameter of a first player when a given activation condition has been satisfied, the activation condition being a condition whereby a process that changes the parameter of the first player is performed; performing an extension control process that changes a parameter of a second player who relates to the first player when the second player has logged in after the activation condition has been satisfied; and adjusting a change width of the parameter of the second player that is changed by the extension control process corresponding to an elapsed time until the second player logs in after the activation condition has been satisfied.

According to the above configuration, the parameter of the first player, and the parameter of the second player (e.g., friend user) who relates to the first player, can be changed when the activation condition (i.e., a condition whereby the process that changes the parameter of the first player is performed) has been satisfied. Specifically, a parameter change effect can be extended between asynchronous games (i.e., a parameter change extension effect can be applied to asynchronous games) based on the relationship between the players. This makes it possible to allow one user and a related user to perceive each other's presence to prompt the users to communicate with each other and feel a sense of solidarity. The parameter of the second player is changed when the second player has logged in, and the change width of the parameter is adjusted corresponding to the elapsed time until the second player logs in after the activation condition has been satisfied. Therefore, the change width of the parameter is not adjusted if the first player notifies the second player that the activation condition has been satisfied, and the second player logs in as quickly as possible, for example.

In the server system, the activation condition may be satisfied when the first player has performed an instruction operation input for using a given item or implementing a given action.

In the server system, the activation condition may be satisfied when the process of the game played by the first player has satisfied a given condition.

It may be determined that the given condition has been satisfied when an item has been acquired, when a specific enemy character has been defeated, when the player has become friends with one hundred players who play the same game, or when a specific stage has been cleared (i.e., when something good has happened for the player), for example. In this case, it is possible to prompt the users to communicate with each other.

With regard to the degree of extension, the change width adjustment section may adjust the change width of the parameter of the second player to be smaller than a change width of the parameter of the first player that is changed by the parameter change control section.

According to this configuration, the extension effect can be reduced as compared with the original change width.

In the server system, the change width adjustment section may change the change width of the parameter of the second player using a degree of friendship between the first player and the second player.

According to this configuration, the change width can be changed based on the degree of friendship between the players.

In the server system, the change width adjustment section may change the change width of the parameter of the second player using a number of the second players.

According to this configuration, the change width of the parameter of the second player can be changed corresponding to the number of second players.

In the server system, the extension control section may include a time limit control section that temporarily changes the parameter of the second player for a given period when the activation condition has been satisfied.

According to this configuration, the extension effect can applied temporarily.

In the server system, the time limit control section may change a time limit up to which the parameter of the second player is changed, using a degree of friendship between the first player and the second player.

According to this configuration, the time in which the extension effect is applied can be changed based on the degree of friendship.

The server system may further comprise:

an extension target selection section that selects an extension target player, the extension target player being a related player among a plurality of related players of the first player that is subjected to the extension control process performed by the extension control section, and the extension control section may perform the extension control process on the extension target player selected by the extension target selection section as the second player.

According to this configuration, the extension target player can be selected from the related players.

In the server system, the extension target selection section may select the extension target player using a degree of friendship between the first player and the related player.

According to this configuration, the extension target player can be selected based on the degree of friendship.

Exemplary embodiments of the invention are described in detail below. Note that the following exemplary embodiments do not in any way limit the scope of the invention defined by the claims laid out herein. Note also that all of the elements described in connection with the following exemplary embodiments should not necessarily be taken as essential elements of the invention.

First Embodiment

A first embodiment to which the invention is applied is described below taking an example in which a first game and a second game are provided to a registered user. The term "user" is used in a general sense, and may refer to a person who plays the game, and the term "player" refers to a person who plays the game. Note that the term "user" and the term "player" may be interchangeable, and may be appropriately replaced by each other.

System Configuration

FIG. 1 is a view illustrating an example of the configuration of a game system according to the first embodiment.

The game system according to the first embodiment includes a server system 1100 that can connect to a communication line 1, and a user terminal (player terminal) 1500 (1500a, 1500b, 1500c, . . . ) that is provided for each player 2 (2a, 2b, 2c, . . . ) who plays the game.

The communication line 1 is a data communication channel. Specifically, the communication line 1 includes a communication network such as a local area network (LAN) using a private line (private cable) for direct connection, Ethernet (registered trademark), and the like, a telecommunication network, a cable network, and the Internet. The communication method may be a cable communication method or a wireless communication method.

The server system 1100 includes one or a plurality of server systems, a storage device, and the like. The server system 1100 provides various services for managing (operating) a community-type website and an online game, manages play data necessary for executing the game, and distributes a client program, data, and the like.

The server system 1100 according to the first embodiment includes a housing 1102, a keyboard 1106, a touch panel 1108, and a storage 1140. A plurality of blade servers 1104 are provided in the housing 1102.

The plurality of blade servers 1104 include (1) an account management server system 1110 that implements a user registration process, a player character initial setting process, and a login/logout process, (2) an online shopping server 1112 that implements an online shopping service process that allows the user to purchase an item used in the game, and (3) a game management server system 1114 that manages data necessary for executing the game, and distributes the data to the user terminal 1500 that has logged in and participates in the online game, for example.

A first game management server system 1115, a second game management server system 1116, . . . are provided as the game management server system 1114 on a game basis, and are connected to each other through an internal line of the server system 1100 so that data communication can be implemented.

Note that each of the blade servers 1104 may be implemented by an independent server system that can perform data communication through the communication line 1. For example, the first game management server system 1115 and the second game management server system 1116 may be an independent first game management server system 1117 and an independent second game management server system 1118.

The user terminal 1500 is a computer (electronic device) that is provided for each player. The user terminal 1500 is implemented by a smartphone, a portable game device, a stationary consumer game device, an arcade game device, a personal computer, a tablet computer, or the like. The user terminal 1500 can connect to the communication line 1, and access the server system 1100.

FIG. 2 is a view ((1) front external view and (2) rear external view) illustrating a configuration example of the user terminal 1500. The user terminal 1500 includes an arrow key 1502, a home key 1504, a touch panel 1506 that functions as an image display device and a touch position input device, a speaker 1510, a microphone 1512, a Global Positioning System (GPS) antenna 1514, a CCD camera module 1516, a control board 1550, and a memory card reader 1542 that reads and writes data from and into a memory card 1540 (i.e., computer-readable information storage medium). The user terminal 1500 also includes a built-in battery, a power button, a volume control button, and the like (not illustrated in FIG. 2).

The CCD camera module 1516 includes an autofocus mechanism, a CCD image sensor, and an image signal generation chip, and is disposed so that the rear side of the user terminal 1500 can be captured (photographed). Note that the image sensor device is not limited to a CCD.

The control board 1550 includes a microprocessor (e.g., central processing unit (CPU) 1551, graphics processing unit (GPU), and digital signal processor (DSP)), an application-specific integrated circuit (ASIC), and an IC memory 1552 (e.g., VRAM, RAM, and ROM).

The control board 1550 also includes a wireless communication module 1553 for connecting to a mobile phone base station, a wireless LAN base station, or the like via wireless communication, an electronic compass 1555, a triaxial gyroscope 1556, and a triaxial acceleration sensor 1557. The control board 1550 further includes interface (I/F) circuits such as a driver circuit that drives the touch panel 1506, a circuit that receives signals from the arrow key 1502 and the home key 1504, an output amplifier circuit that outputs a sound signal to the speaker 1510, an input signal generation circuit that generates a voice signal collected by the microphone 1512, and a signal input-output circuit that inputs and outputs a signal to and from the memory card reader 1542. The elements included in (mounted on) the control board 1550 are electrically connected through a bus circuit or the like so that the elements can exchange data and signals.

The GPS module 1554 and the GPS antenna 1514 function as a means that acquires position information utilizing the GPS. The GPS module 1554 outputs the position information (e.g., latitude and longitude) and additional information (absolute time) every given time (e.g., every second) as data that can be processed by the control board 1550 based on signals output from a GPS satellite 3 and received by the GPS antenna 1514. Note that the positioning system is not limited to the GPS. A satellite positioning system other than the GPS, or a positioning system that does not utilize a satellite may also be used as the positioning system. When using a positioning system that does not utilize a satellite, the wireless communication module 1553 may acquire the position information by performing a positioning process using the principle of triangulation based on a signal from a mobile phone base station to which the wireless communication module 1553 can connect via wireless communication, for example.

The control board 1550 temporarily stores a game client program and data acquired from the server system 1100 in the IC memory 1552. The control board 1550 executes the program to perform a calculation process, and controls each section of the user terminal 1500 based on an operation input performed using the arrow key 1502, the home key 1504, and the touch panel 1506 to implement the online role-playing game (RPG). Note that the user terminal 1500 may read the necessary program and the setting data from the memory card 1540 instead of acquiring the necessary program and the setting data from the server system 1100.

Extension Effect Between Asynchronous Games

In the first embodiment, the user must acquire a user account by performing given procedures in order to use the service provided by the server system 1100. When the user has logged in by inputting a password linked to the acquired account, the user can use various services (e.g., item online shopping service, message exchange (between registered users) service, friend user registration service, and game play service).

The message exchange service is a service that supports message (e.g., short mail) exchange between the users who have logged in. The message exchange service is implemented by a push notification or the like, for example. The server system 1100 provides a function that allows each user to register another user who has turned out to be congenial with each user through message exchange as a "friend" by performing given registration procedures. A user who has been registered as a "friend" by another user is hereinafter referred to as "friend user".

The user can play an arbitrary game among a plurality of games anytime he wants by registering himself as a game user through given procedures. For example, when one user has registered himself as a user of a first game and a second game, a parameter used in the second game is changed corresponding to the progress of the first game to implement a parameter change extension effect between asynchronous games.

Figure 3:
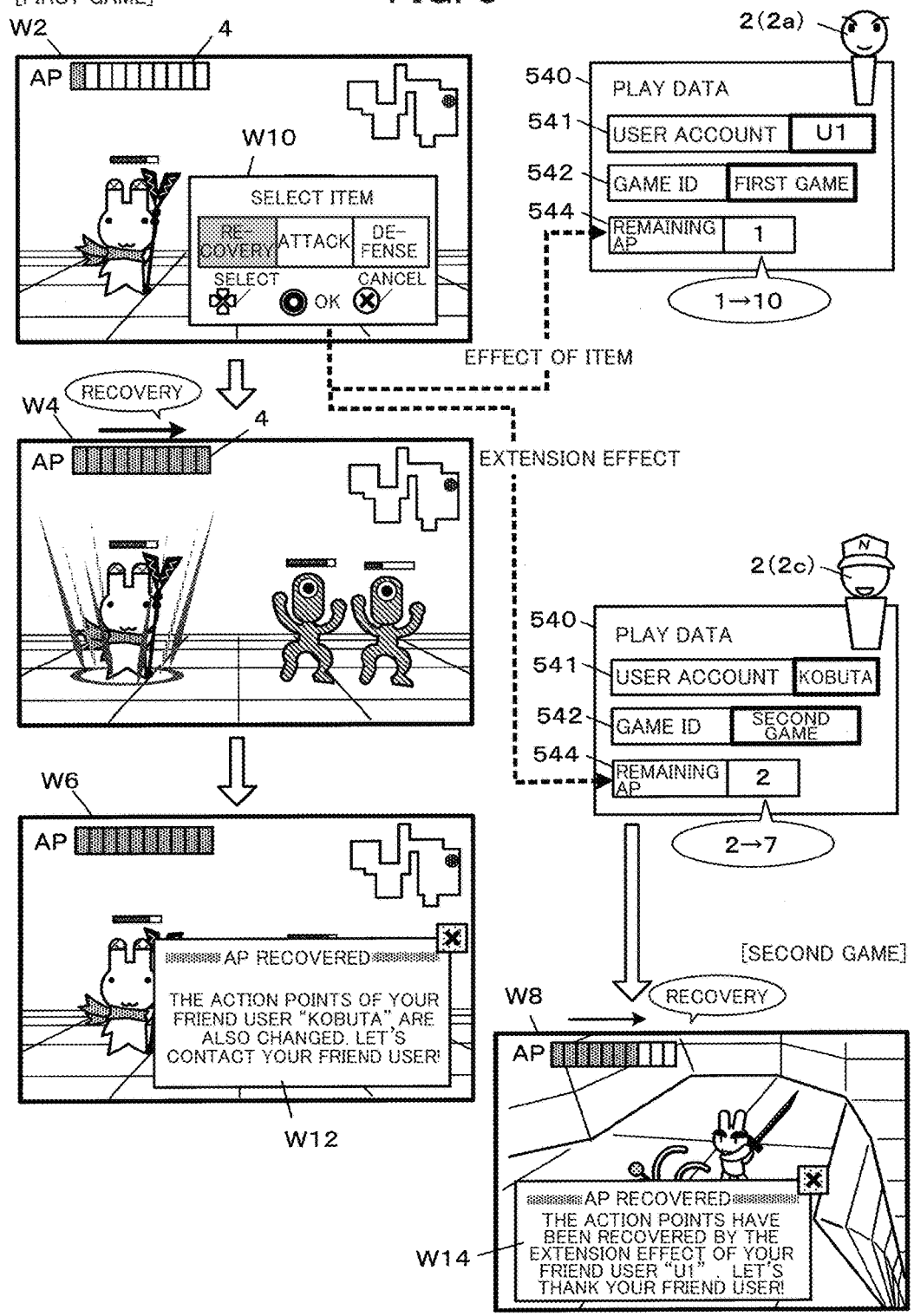
FIG. 3 is a view illustrating a parameter change extension effect according to the first embodiment that is applied to asynchronous games.

FIG. 3 is a view illustrating the parameter change extension effect according to the first embodiment that is applied to asynchronous games.

In the first embodiment, when one user plays the first game, and the progress of the first game has satisfied a given activation condition, a parameter of a friend user who plays the second game is changed to be advantageous to the player.

The game played by one user may be the same as the game played by the friend user. Note that an example in which the game played by one user is the first game, and the game played by the friend user is the second game, is described below for convenience of explanation.

Examples of the activation condition include a condition whereby a given item has been used, acquired, or purchased, a condition whereby a given stage has been cleared, a condition whereby a given non-player character (NPC) has been defeated, a condition whereby magic, a technique, or the like has been mastered, a condition whereby a special command has been acquired, a condition whereby a killer technique has been performed, and the like. The parameter that is changed may be set appropriately.

In the first embodiment, action points AP are given during the first game and the second game as a parameter relating to the action of the player character. The action points AP are consumed when the player character takes an action. The number of action points AP consumed differ depending on the type of action. For example, two action points AP are consumed when the player character moves, three action points AP are consumed when the player character makes an attack, and one action point AP is consumed when the player character uses an item. The action points AP are automatically recovered with the passage of time. It is possible to instantaneously recover the action points AP by the use of a given AP recovery item. The AP recovery item is a charge item that can be purchased through the online shopping service.

For example, an action point meter 4 that represents the latest maximum action points AP and the remaining action points AP is displayed on a game screen W2. In the example illustrated in FIG. 3, each hatched square represents the remaining action points AP.

When the player has performed an instruction operation input for using the AP recovery item during the first game (see the game screen W4), a remaining AP 544 included in play data 540 relating to the first game is incremented due to a direct effect of the AP recovery item, and the action points AP are recovered/increased (recovered from "1" to "10" on the game screen W4).

An activation notification W12 that notifies that the activation condition has been satisfied is displayed on the game screen displayed during the first game (see the game screen W6). The activation notification W12 notifies an announcement relating to an extension effect.

A friend user to whom the extension effect is applied (i.e., a friend user 2 (2*c*) in the example illustrated in FIG. 3) is selected from the friend users of the user 2 (2*a*) who plays the first game, and the remaining AP 544 included in the play data 540 of the selected friend user who plays the second game is recovered/increased (recovered from "2" to "7" in the example illustrated in FIG. 3).

Specifically, when the friend user 2 (2*c*) plays the second game, the action points AP that were "2" when the friend user 2 (2*c*) stopped playing the second game have been recovered to "7" (see the game screen W8). An extension attainment notification W14 is displayed on the game screen W8 displayed during the second game, and an announcement that the extension effect has been applied to the player is displayed.

According to the first embodiment, the direct effect of the use of the AP recovery item by the user 2 (2*a*) during the first game, and the extension effect that recovers the action points AP in the second game can be obtained, and the user 2 (2*a*) and the friend user 2 (2*c*) are notified to that effect. The first game and the second game are asynchronous games that are independent of each other. However, the user who plays the first game and the user who plays the second game can perceive each other's presence through the extension effect and the notification. Therefore, it is possible to prompt communication between the users and improve a sense of solidarity between the users (e.g., "Have you received the AP recovery effect? It was quite expensive. How was the effect?", or "I received the AP recovery effect! I was in trouble, and it was very helpful. By the way, . . . ").

Note that the activation condition, the parameter (first parameter) that is changed during the first game when the activation condition has been satisfied, and the parameter (second parameter) that is changed during the second game due to the extension effect can be set appropriately.

For example, the progress of the game may be set to be the activation condition. Specifically, it may be determined that the activation condition has been satisfied when an item advantageous to the player has been acquired during the first game, or when a specific enemy character has been defeated, or when an in-game puzzle has been solved, or when a new magic spell has been mastered, or when a killer technique has been performed, for example. More specifically, an item that is effective only within a given time (e.g., an item that increases the moving speed only within a first given time) may be used for the activation condition. In this case, the corresponding first parameter (e.g., moving capability or recovery capability) may be incremented for the first given time in the first game when the item has been used, and returned to the original value when the first given time has elapsed. Likewise, the corresponding second parameter may be incremented for a second given time (that is the same as or differs from the first given time) in the second game, and returned to the original value when the second given time has elapsed. The second parameter may differ in type from the first parameter.

The parameter increment width applied to the second game (i.e., the extension effect applied to the second game) is basically set to be equal to or smaller than that applied to the first game.

For example, when using the AP recovery item, the action points AP are incremented by 10 points in the first game, while the action points AP are incremented by 8 points in the second game (e.g., the recovery effect is reduced in the second game as compared with the first game). In this case, the increment width is decremented by 20% as compared with the first game. When using an item for which the effective time is limited, the effect is maintained for 100 seconds in the first game, while the effect is maintained for 50 seconds in the second game (i.e., the increment width is decremented by 50% as compared with the first game), for example.

The increment width of the parameter applied to the second game may be determined corresponding to the relationship between the user 2 (2*a*) and the friend user 2 (2*b*) (e.g., the likability that is automatically determined corresponding to the communication frequency, or the number of common games played by the user 2 (2*a*) and the friend user 2 (2*b*)). The parameter included in the play data 540 relating to the first game and the parameter included in the play data 540 relating to the second game that are identical in type (e.g., player level, experience value, virtual money balance, or play date/time) may be compared, and the increment width may be determined corresponding to the difference therebetween. For example, the level of the player who plays the first game and the level of the player who plays the second game are compared, and the extension effect to be applied is decreased as the difference therebetween increases. Alternatively, the extension effect to be applied may be decreased as the level of the player who plays the second game decreases.

This prevents a situation in which the parameter of one of the games is changed to a large extent, whereby the game balance is impaired, even when the users or the games differ as to the progress level, skill, or play count.

The number of friend users selected as the parameter change extension target may be set appropriately. When a plurality of friend users are selected as the parameter change extension target, the extension effect may be divided corresponding to the number of friend users selected as the parameter change extension target. For example, when the action points AP are incremented by 100 points due to the extension effect, and the number of friend users selected as the parameter change extension target is 5, the extension effect may be divided so that the action points AP are incremented by 20 points per friend user. Alternatively, the extension effect may be divided corresponding to the relationship (e.g., the degree of friendship (or likability)) between the user who plays the first game and the friend user selected as the extension target.

Although an example in which the game played by the user 2 (2*a*) and the game played by the friend user 2 (2*b*) are different games (first game and second game) has been described above, the game played by the user 2 (2*a*) and the game played by the friend user 2 (2*b*) may be an identical game. In this case, the process of the game played by each user is also controlled independently (asynchronously). Therefore, the game played by the user 2 (2*a*) and the game played by the friend user 2 (2*b*) may be referred to as "first game" and "second game", respectively, for convenience of explanation.

Although an example in which the parameter of the user 2 (2*a*) and the parameter of the friend user 2 (2*b*) are changed to be advantageous to the player has been described above, one or both of the parameter of the user 2 (2*a*) and the parameter of the friend user 2 (2*b*) may be changed to be disadvantageous to the player.

Functional Blocks

A functional configuration that implements the first embodiment is described below.

Figure 4:
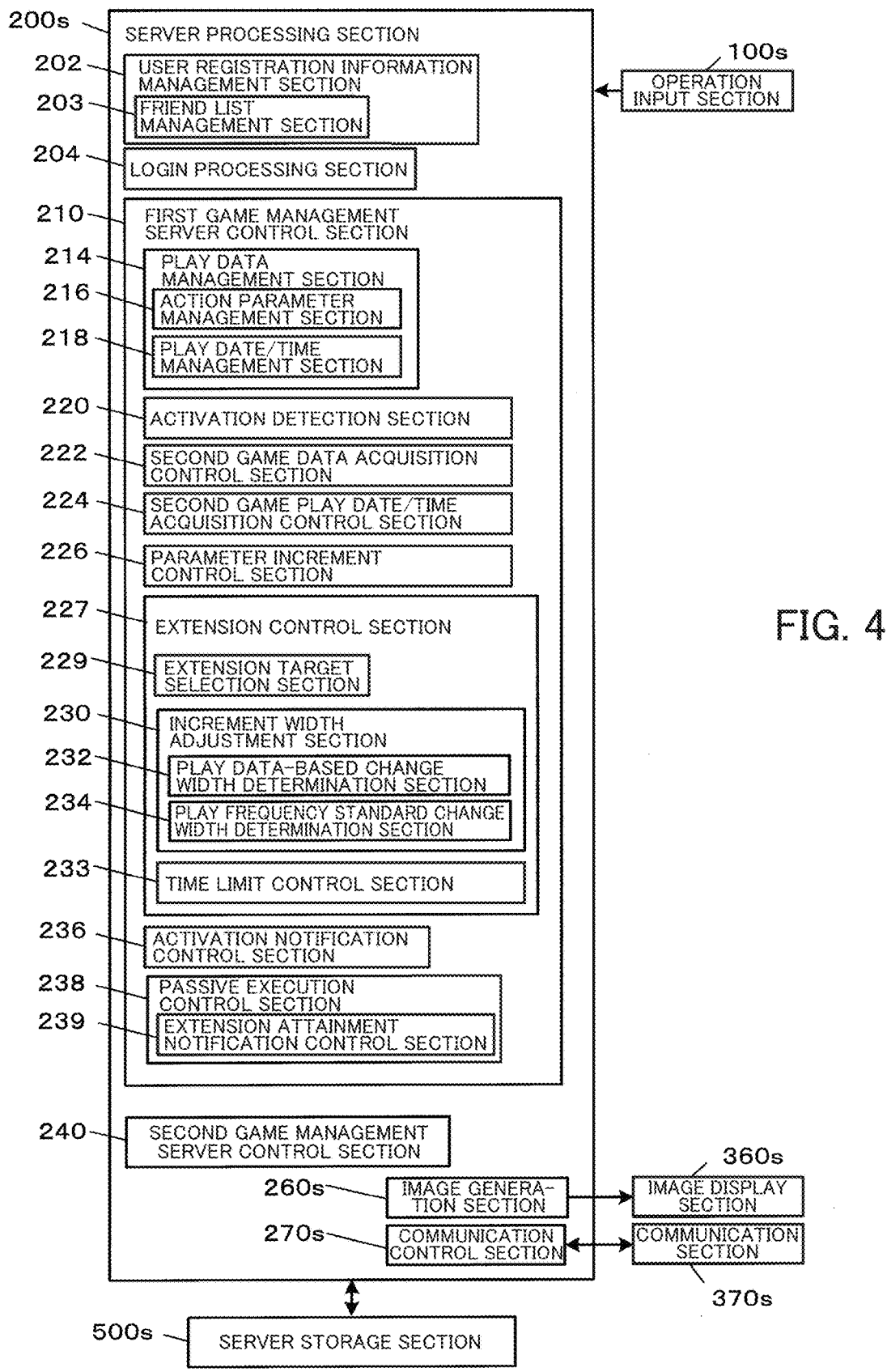
FIG. 4 is a functional block diagram illustrating an example of the functional configuration of a server system according to the first embodiment.

FIG. 4 is a functional block diagram illustrating an example of the functional configuration of the server system 1100 according to the first embodiment. The server system 1100 includes an operation input section 100*s*, a server processing section 200*s*, an image display section 360*s*, a communication section 370*s*, and a server storage section 500*s*.

The operation input section 100*s* outputs an operation input signal to the server processing section 200*s* corresponding to an operation input (including an instruction operation input regarding the action of the player character) performed by the server operator. The operation input section 100*s* may be implemented by a keyboard, a touch panel, a mouse, a trackpad, or the like. The keyboard 1106 and the touch panel 1108 illustrated in FIG. 1 correspond to the operation input section 100*s*.

The server processing section 200*s* is implemented by electronic parts such as a microprocessor (e.g., CPU and GPU), an ASIC, and an IC memory. The server processing section 200*s* exchanges data with each functional section, and performs a calculation process based on a given program, data, the operation input signal from the operation input section 100*s*, a request from an external device (another computer) that has accessed the server system 1100 from the outside through the communication section 370*s*, and the like to control the operation of the server system 1100. The blade server 1104 (i.e., control board) illustrated in FIG. 1 corresponds to the server processing section 200*s*.

The server processing section 200*s* according to the first embodiment includes a user registration information management section 202, a login processing section 204, a first game management server control section 210, a second game management server control section 240, an image generation section 260*s*, and a communication control section 270*s*. Note that the number of game management server control sections may be appropriately changed corresponding to the types of games that can be played.

The user registration information management section 202 performs a user information acquisition/registration management process (e.g., a process that issues a new user account, or registers a password). Note that the user registration information management section 202 may be implemented by appropriately utilizing known user registration technology used for a community-type website and an online game. The user registration information management section 202 according to the first embodiment includes a friend list management section 203, and performs a friend user registration/deregistration process.

The login processing section 204 controls a login corresponding to a request from the user terminal 1500 that has connected the server system 1100 through the communication line. The login processing section 204 may be implemented by appropriately utilizing known login control technology used for a community-type website and an online game. The account management server 1110 illustrated in FIG. 1 corresponds to the user registration information management section 202 and the login processing section 204.

The first game management server control section 210 performs a process necessary for controlling the progress of the first game, and displaying a game image and the like on the user terminal 1500, and the second game management server control section 240 performs a process necessary for controlling the progress of the second game, and displaying a game image and the like on the user terminal 1500. Specifically, the first game management server control section 210 and the second game management server control section 240 operate continuously, and generate play data 540 when a game start request has been received from the user terminal 1500 to control the progress of the game. The first game management server control section 210 and the second game management server control section 240 differ in only the details of the game, and basically have an identical configuration. The following description focuses on the first game management server control section 210.

The first game management server control section 210 includes a play data management section 214, an activation detection section 220, a second game data acquisition control section 222, a second game play date/time acquisition control section 224, a parameter increment control section 226, an extension control section 227, an activation notification control section 236, and a passive execution control section 238.

The play data management section 214 manages data (play data) that describes the progress of the game controlled by the game management server control section. The play data management section 214 includes an action parameter management section 216 and a play date/time management section 218.

The action parameter management section 216 manages an action parameter of the player character. In the first embodiment, the action points AP are decremented (consumed) by a value corresponding to the type of action each time an action instruction operation input has been performed during the game. The action points AP are incremented (recovered) with the passage of time, or when the AP recovery item is used.

The play date/time management section 218 manages the play date/time of the player. Specifically, the play date/time management section 218 performs a control process that links, stores, and manages the play start date/time and the play stop date/time. When the player logs in each time the player plays the game, the play date/time management section 218 stores and manages each play (login) date/time on a player basis.

The activation detection section 220 detects whether or not a given activation condition has been satisfied, the activation condition being a condition whereby a process that increments a first parameter of the player is performed. In the first embodiment, whether or not the activation condition has been satisfied is determined by detecting whether or not at least an instruction operation input for using the AP recovery item has been performed.

The second game data acquisition control section 222 performs a control process that acquires the second game play data of the friend user of the player who plays the first game from the server system that manages the process of the second game.

The second game play date/time acquisition control section 224 performs a control process that acquires the second game play date/time data of the friend user of the player who plays the first game from the server system (second server system) that manages the process of the second game.

The parameter increment control section 226 changes the first parameter of the player when the activation detection section 220 has detected that the activation condition has been satisfied. In the first embodiment, the action points AP are set to be the first parameter, and the action points AP of the player are incremented (recovered) by a given recovery amount when an instruction operation input for using the AP recovery item has been performed. Specifically, the first parameter is incremented.

The first parameter may be appropriately set corresponding to the type of game. For example, a battle capability parameter value (e.g., attack capability and defense capability), a win probability applied to a lottery that is held during the game or prior to the start of the game, the likability, the experience value, or the degree of growth of the player character, or the like may be set to be the first parameter corresponding to the type of game. The first parameter may be incremented corresponding to the meaning of the set parameter. Specifically, the first parameter may be incremented to be advantageous to the player. For example, when the capability parameter or the win probability is used as the first parameter, the first parameter may be temporarily incremented for a given period when the activation detection section 220 has detected that the activation condition has been satisfied.

The extension control section 227 performs an extension control process that changes the parameter of a related player (friend user) of the player who plays the first game. Specifically, the extension control section 227 performs an extension process on another game.

In the first embodiment, the parameter is changed so that the parameter is incremented. More specifically, when the activation detection section 220 has detected that the activation condition has been satisfied, the extension control section 227 performs the extension control process that causes the server system (second server system) that manages a second parameter of each player who plays the second game, and controls the process of the second game, to change the parameter so that the parameter of the related player (friend user) of the player who plays the first game is incremented (i.e., to be advantageous to the friend user).

In the first embodiment, the action points AP are set to be the second parameter, and the second parameter is changed so that recovery of the action points AP in the first game due to the AP recovery item is extended to the action points AP in the second game.

Note that the second parameter may differ in type from the first parameter. The second parameter may be appropriately changed corresponding to the type of the second parameter. For example, when the capability parameter or the win probability (applied to a lottery that is held during the game or prior to the start of the game) is used as the second parameter, the second parameter may be temporarily incremented for a given period.

When the first game management server system 1115 and the second game management server system 1116 are server systems independent of each other, the extension control section 227 may be implemented by providing a common API (application program interface) that can externally control the system (external API), and externally changing the second parameter using the API.

The extension control section 227 includes an extension target selection section 229, an increment width adjustment section 230, and a time limit control section 233.

The extension target selection section 229 selects the extension target for which the play data (parameter) relating to the second game is changed, from the friend users of the user (player) who plays the first game. The extension target selection section 229 may select an arbitrary number of friend users as the extension target. The extension target selection section 229 may select a given number of friend users as the extension target, or may select the friend users in a given ratio as the extension target, or may select all of the friend users as the extension target. The number of friend users selected as the extension target may be increased along with the growth of the player character or the progress of the game corresponding to the progress (e.g., player level or experience value) of the first game.

The increment width adjustment section 230 adjusts the increment width (change width) of the second parameter to be smaller than the increment width of the first parameter that is incremented by the parameter increment control section 226. The increment width adjustment section 230 includes a play data-based change width determination section 232 and a play frequency-based change width determination section 234.

The play data-based change width determination section 232 determines the increment width (change width) based on the play data relating to the second game. In the first embodiment, the play data-based change width determination section 232 determines the change width of the second parameter using the difference between the play data of the player who plays the first game and the play data of the friend user who plays the second game that has been acquired by the second game data acquisition control section 222.

The play frequency standard change width determination section 234 determines the increment width (change width) based on the history of the play date/time of the second game. In the first embodiment, the play frequency standard change width determination section 234 calculates the difference between the play frequency of the player who plays the first game and the play frequency of the friend user based on the play date/time of the player who plays the first game that is managed by the play date/time management section 218, and the play date/time of the friend user who plays the second game that has been acquired under control of the second game play date/time acquisition control section 224, and determines the increment width (change width) of the second parameter using the difference in play frequency. For example, the increment width is decreased when the play frequency of the friend user is lower than the play frequency of the player who plays the first game. The increment width may not be decreased, or may be increased to some extent, when the play frequency of the friend user is higher than the play frequency of the player who plays the first game.

Each change width determination section compares the parameters that represent the play skill and the play progress level (e.g., player level, play count, or play date/time included in the play data 540), and sets the change width to be almost equal to or smaller than that of the first game when the play skill and the play progress level of the friend user are lower than those of the player who plays the first game.

In the first embodiment, each friend user selected as the extension target can receive the same extension effect. Note that the increment width adjustment section 230 may have a function of changing the change width of the parameter of each related player using the number of related players (friend users) of the user (player) who plays first game, and change the extension effect applied to each friend user selected as the extension target. For example, when a plurality of friend users have been selected as the extension target, the extension effect may be equally divided corresponding to the number of friend users, or may be divided corresponding to the parameter of each friend user (e.g., the relationship in likability with the user 2 who plays the first game, item purchase history, or player level) (e.g., a higher extension effect is applied when the likability is high, or the item purchase amount of large, or the player level is high).

When the capability parameter or the win probability (applied to a lottery that is held during the game or prior to the start of the game) is used as the parameter, the time limit control section 233 temporarily increments the parameter for a given period when incrementing the parameter of the related player (friend user) (extension target). Specifically, the time limit control section 233 temporarily stores the parameter, and increments the parameter. The time limit control section 233 starts a timer that measures the given period, and returns the parameter to the original value when the given period has elapsed. When only the action points AP are incremented, the function of the time limit control section 233 may be disabled, and the process that returns the parameter to the original value may be omitted.

The activation notification control section 236 performs a control process that displays a notification (e.g., a notification that notifies that the activation condition has been satisfied, a notification that notifies that the first parameter of the player is incremented, or a notification that notifies that the second parameter (e.g., the action points AP in the second game) of the friend user is changed) on the user terminal 1500 of the player. For example, the activation notification control section 236 performs the control process that displays the activation notification W12 illustrated in FIG. 3. When the first parameter is changed temporarily, a notification may be displayed only during the period in which the first parameter is changed, or may be displayed only at the timing at which the first parameter is changed.

The passive execution control section 238 changes the first parameter relating to the friend user (i.e., the player for the first game management server control section 210) of the player who plays the game using another server system according to the extension control process performed by the other server system. The passive execution control section 238 includes an extension attainment notification control section 239.

The extension attainment notification control section 239 performs a control process that displays the extension attainment notification W14 (see FIG. 3) that notifies the player that the parameter is changed due to the extension effect based on game play of the friend user on the user terminal 1500. When the extension effect is applied temporarily, a notification may be displayed only during the period in which the parameter is changed, or may be displayed only at the timing at which the parameter is changed.

The image generation section 260s is implemented by a processor (e.g., graphics processing unit (GPU) or a digital signal processor (DSP)), a video signal IC, a program (e.g., video codec), a drawing frame IC memory (e.g., frame buffer), a texture data decompression IC memory, and the like. The image generation section 260s generates a screen (image) every frame (e.g., ⅟60th of a second) based on the processing results of the server processing section 200s, and outputs image signals of the generated screen (image) to the image display section 360s.

The image display section 360s displays various images based on the image signals input from the image generation section 260s. The image display section 360 may be implemented by an image display device such as a flat panel display, a cathode-ray tube (CRT), a projector, or a head-mounted display. The touch panel 1108 illustrated in FIG. 1 corresponds to the image display section 360s.

The communication control section 270s performs a data communication process, and exchanges data with an external device through the communication section 370s.

The communication section 370s connects to the communication line 1 to implement communication. The communication section 370s is implemented by a transceiver, a modem, a terminal adapter (TA), a jack for a communication cable, a control circuit, and the like.

The server storage section 500s stores a program and data that cause the server processing section 200s to implement its functions. The server storage section 500s is used as a work area for the server processing section 200s, and temporarily stores the results of calculations performed by the server processing section 200s based on a program, information received from the user terminal 1500, and the like. The function of the server storage section 500s is implemented by an IC memory (e.g., RAM and ROM), a magnetic disk (e.g., hard disk), an optical disk (e.g., CD-ROM and DVD), or the like. The information storage medium (e.g., IC memory) provided in the blade server 1104 and the storage 1140 illustrated in FIG. 1 correspond to the server storage section 500s.

Figure 5:
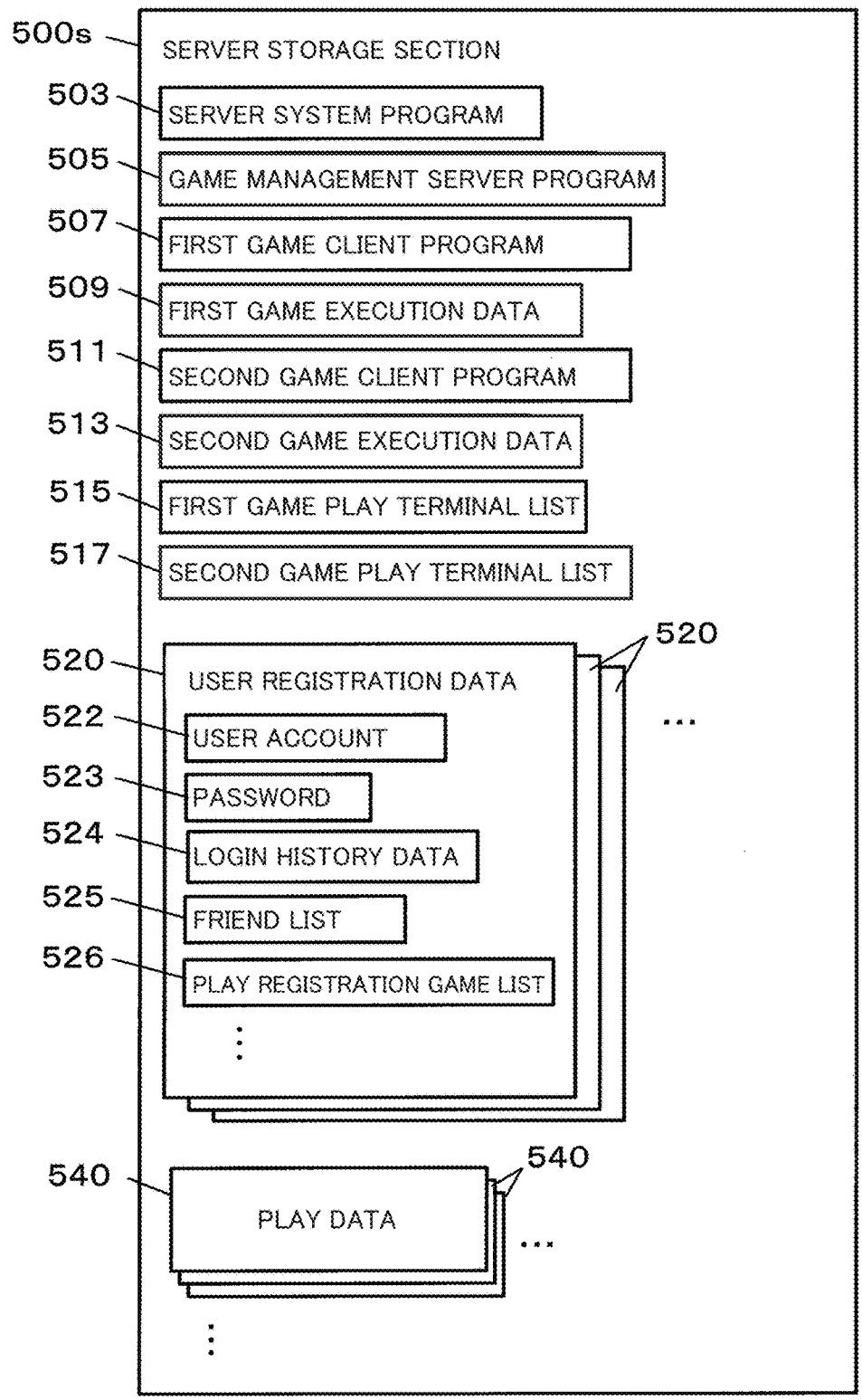
FIG. 5 is a block diagram illustrating a configuration example of information stored in a server storage section according to the first embodiment.

FIG. 5 is a view illustrating a configuration example of information stored in the server storage section 500s according to the first embodiment. The server storage section 500s according to the first embodiment stores a server system program 503, a game management server program 505, a first game client program 507, first game execution data 509, a second game client program 511, second game execution data 513, a first game play terminal list 515, and a second game play terminal list 517. The server storage section 500s also stores user registration data 520 and the play data 540. The server storage section 500s also appropriately stores information (e.g., given period count value and flag) that is required for a game management process, a friend login bonus-giving process, and the like.

The server system program 503 causes a computer to implement the basic functions of a server. The server system program 503 also causes the server processing section 200s to function as the user registration information management section 202 and the login processing section 204.

The game management server program 505 causes the server processing section 200s to implement the function of the game management server control section (first game management server control section 210 and second game management server control section 240).

The first game client program 507 is a client program that is provided to the user terminal 1500 that requests to play the first game. The user terminal 1500 downloads the first game client program 507, stores the first game client program 507 in the information storage medium provided to the user terminal 1500, and executes the first game client program 507. The first game client program 507 is implemented by a dedicated program, a web browser program, a plug-in that implements dynamic display on the web browser program, or the like. A plug-in that implements dynamic display on the web browser program may be used when implementing the online game as a browser game. The second game client program 511 is a client program that allows the player to play the second game using the user terminal 1500.

The first game execution data 509 includes data necessary for executing the first game. For example, the first game execution data 509 includes data for setting a game field, model data and motion data about the player character and an enemy character, texture data, the initial ability parameter value of each character, setting data about an item that can be used in the game, and the like. The second game execution data 513 is game execution data for executing the second game.

The first game play terminal list 515 is list data relating to the user terminals 1500 that execute the first game, and the second game play terminal list 517 is list data relating to the user terminals 1500 that execute the second game. The first game play terminal list 515 and the second game play terminal list 517 include the user account, the IP address, and the like of each terminal.

The user registration data 520 is provided corresponding to each registered user (player), and includes information about each player. For example, the user registration data 520 includes a user account 522 and a password 523 that are necessary for a login. The user registration data 520 also includes login history data 524, a friend list 525, and a play registration game list 526.

The login history data 524 includes the history of the login date/time, the logout date/time, and the like.

The friend list 525 includes information about the user who is registered as a friend. As illustrated in FIG. 6, the friend list 525 includes a user account 525a, a degree of friendship 525b, and chat history data 525c relating to the friend user, for example.

The play registration game list 526 includes identification information about games for which the user is registered as a player using the same user account. In the first embodiment, the play registration game list 526 includes the identification information about the first game and the identification information about the second game.

The play data 540 is provided corresponding to each combination of the game and the player, and includes data that describes the progress of the game.

As illustrated in FIG. 7, the play data 540 includes a user account 541 (i.e., identification information about the player), a game ID 542, the remaining AP 544 (i.e., the remaining action points AP), a player level 546 that is automatically set corresponding to the game results and the like, an experience value 548 of the player character within the game world, a virtual money balance 550 for purchasing an item that can be used in the game world, a play date/time history 552, a possessed item list 554, and a player character capability parameter value table 556. The play data 540 may also include information (e.g., timer value or flag) that is necessary for controlling the process of the game.

Flow of Process

Figure 8:
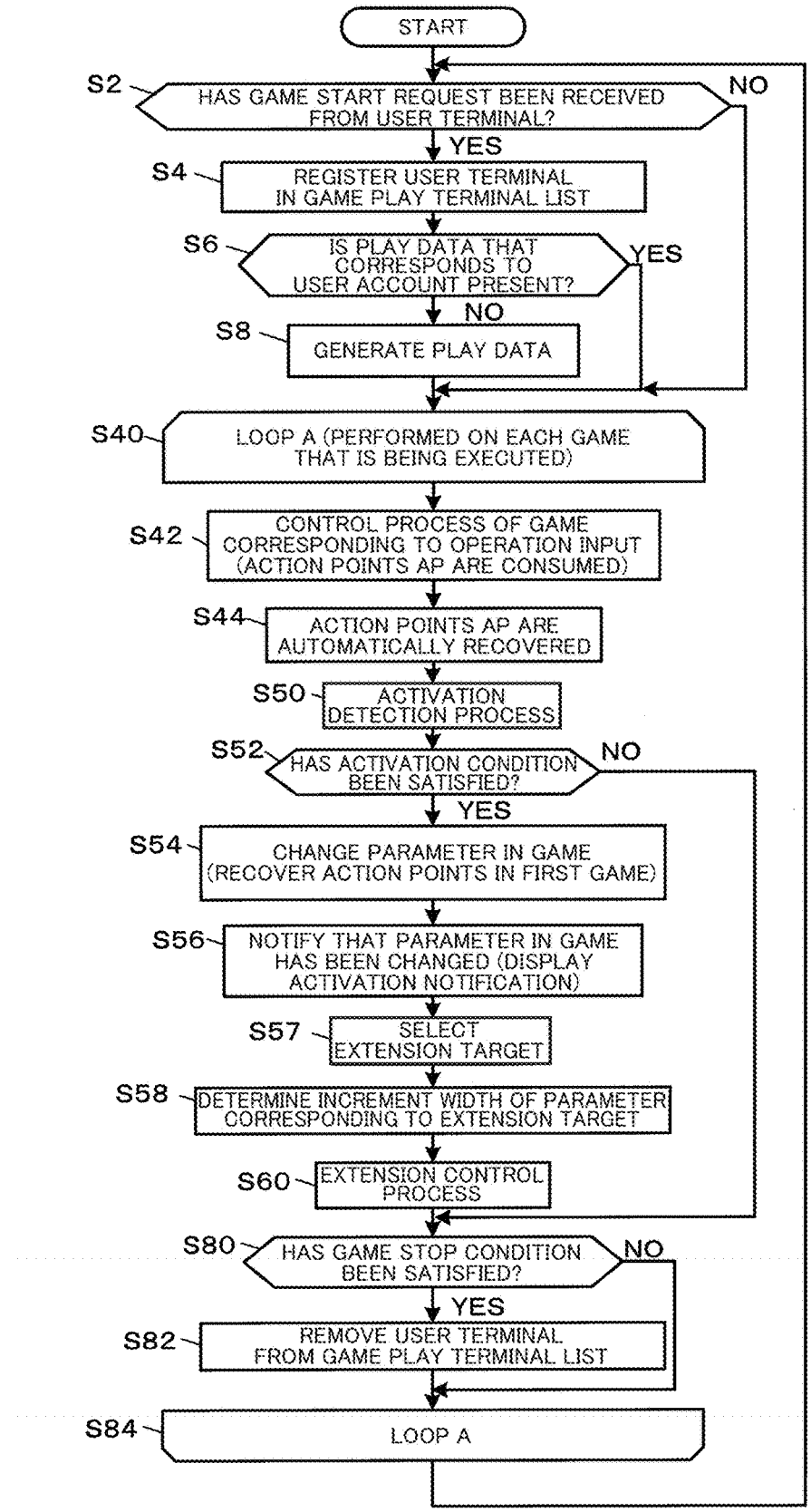
FIG. 8 is a flowchart illustrating the flow of a parameter change extension process according to the first embodiment that is applied to asynchronous games.

The flow of the process performed by the server system that executes the first game (first game management server system 1115) is described below with reference to FIG. 8. Note that the player has acquired the user account, and registered several related users as a friend. The friend user registration/deregistration process using the friend list may be implemented by appropriately utilizing known technology, and description thereof is omitted.

When a game start request has been received from the user terminal 1500 (YES in step S2), the first game management server control section 210 registers the user terminal 1500 that has transmitted the game start request in the first game play terminal list 515, and updates the play date/time history 552 included in the play data 540 (step S4).

When the play data 540 relating to the first game that corresponds to the user account of the player of the user terminal 1500 that has transmitted the game start request is not present (NO in step S6), the first game management server control section 210 generates the play data 540 for the player (step S8).

The first game management server control section 210 performs a loop A process corresponding to each game that is being played (steps S40 to S84).

Specifically, the first game management server control section 210 controls the process of the game corresponding to an operation input (step S42). When the game utilizes the action points, the action points AP are consumed when the player character takes an action. The action points AP are automatically recovered each time a given unit time has elapsed (step S44). In the step S42, the virtual money balance 550 may be decremented (updated) by the item purchase amount when an item purchase operation input has been performed, and the experience value 548 may be incremented when an enemy character has been defeated.

The first game management server control section 210 performs the activation detection process (step S50). In the first embodiment, whether or not an operation input for using a given item (AP recovery item) has been performed is detected. Note that the configuration may differ depending on the activation condition. For example, when whether or not the activation condition has been satisfied, is detected by detecting whether or not a specific character (e.g., dungeon boss character) has been defeated, whether or not the life points of the specific character have reached "0" may be detected. When whether or not the activation condition has been satisfied, is detected by detecting whether or not a given item has been acquired, whether or not the given item has been acquired may be detected.

When it has been detected that the activation condition has been satisfied (YES in step S52), the first game management server control section 210 increments the first parameter of the player character that appears in the first game (step S54). In the first embodiment, the first game management server control section 210 recovers the action points AP. When whether or not the activation condition has been satisfied is detected by detecting whether or not a specific character has been defeated, for example, the experience value 548 (see FIG. 7) or the like may be appropriately incremented instead of recovering the action points AP.

The first game management server control section 210 performs the display control process that displays the activation notification W12 (see FIG. 3) on the user terminal 1500 of the player (step S56).

The first game management server control section 210 selects a friend user who is set to be the extension target (step S57). For example, the first game management server control section 210 refers to the friend list 525 of the player who plays the first game, and selects a given number of friend users from the friend users registered in the friend list 525 in descending order of the degree of friendship 526*b* (see FIG. 6). Alternatively, the first game management server control section 210 may select the friend users who have reached a given high degree-of-friendship reference value. The first game management server control section 210 may refer to the play date/time history 552 included in the play data 540 of each friend user, calculate the play frequency (e.g., the login count during a given unit period), and select a given number of friend users in descending order of the play frequency.

The first game management server control section 210 determines the increment width of the parameter corresponding to each extension target (step S58).

In the first embodiment, the increment width is determined referring to the play data 540 that is currently used in the first game and the play data 540 of the extension target friend user. More specifically, the first game management server control section 210 acquires the play data 540 of the extension target friend user from the second game management server control section 240. The first game management server control section 210 compares the player level 546 of the player who plays the first game and the player level 546 of the friend user who plays the second game. When the player level 546 of the player who plays the first game is (almost) equal to or higher than the player level 546 of the friend user who plays the second game, the increment width (change width) is set to be a given standard value. The standard value may be set corresponding to the type of AP recovery item. When the player level 546 of the friend user who plays the second game is higher than the player level 546 of the player who plays the first game, the increment width (change width) is changed using a function that utilizes the difference in player level 546 as a variable so that the increment width decreases as compared with the standard value as the difference in player level 546 increases.

The first game management server control section 210 calculates the play frequency of the first game and the play frequency of the second game by the friend user from the play date/time history 552 relating to the first game and the play date/time history 552 of the friend user relating to the second game, and uses the increment width (change width) determined based on the player level 546 when the play frequency of the first game is (almost) equal to or higher than the play frequency of the second game. When the play frequency of the second game is higher than the play frequency of the first game, the increment width (change width) that has been determined is decremented.

Note that the following method may be used instead of setting the increment width based on the player level 546 or the play frequency. Specifically, table data in which the player level 546 is linked to the increment width in advance corresponding to the details of the second game may be provided, and the increment width may be determined referring to the table data. For example, the player level 546 of the friend user relating to the second game may be set within the range of "1" to "5". The increment width may be set to the standard value when the player level 546 is "3", set to a value smaller than the standard value when the player level 546 is lower than "3", and set to a value larger than the standard value when the player level 546 is higher than "3". In this case, an increment width appropriate for the player level of each friend user relating to the second game can be determined regardless of the skill, the progress level, and the like of the player who plays the first game.

The increment width (change width) may be set to a value smaller than the standard value when the play frequency of the second game by the friend user is lower than a given desired frequency, and may be set to a value larger than the standard value when the play frequency of the first game and the play frequency of the second game have reached the desired frequency. Alternatively, the increment width of the parameter during the second game may be increased or decreased in proportion to the player level relating to the first game.

The data included in the play data 540 that is referred to when determining the increment width is not limited to the player level 546, but may be the experience value 548 or the virtual money balance 550.

When dividing the extension effect, the increment width of the parameter is determined corresponding to each extension target.

When the first game management server control section 210 has determined the increment width, the first game management server control section 210 performs the extension control process using the determined increment width (step S60).

Specifically, the first game management server control section 210 externally controls the second game management server system 1116 to increment the remaining AP 544 included in the play data 540 corresponding to the user account 522 of the friend user selected as the extension target in the second game by the increment width (change width) determined in the step S58. The action points AP in the second game are thus recovered. When the capability parameter or the like is used as the second parameter instead of the action points AP, the corresponding value in the capability parameter value table 556 is incremented by the determined increment width (change width).

For example, when the capability parameter or the win probability (applied to a lottery that is held during the game or prior to the start of the game) is incremented for a given period due to the extension effect, the parameter value is temporarily stored before incrementing the parameter value, and the parameter value is then incremented. A timer that measures the given period is started, and the parameter is returned to the original value when the given period has elapsed.

After completion of the extension control process, the first game management server control section 210 determines whether or not a game stop condition has been satisfied (step S80). The first game management server control section 210 determines that the game stop condition has been satisfied when a game stop operation input has been performed, or when communication with the user terminal 1500 has been disrupted for a given time, or when the end of the story of the game has been reached, for example.

When the game stop condition has been satisfied (YES in step S80), the first game management server control section 210 removes the user terminal 1500 from the first game play terminal list 515 (step S82), and terminates the loop A process (step S84).

When the first game management server control section 210 has performed the loop A process on each game that is being executed, the first game management server control section 210 performs the step S2.

Figure 9:
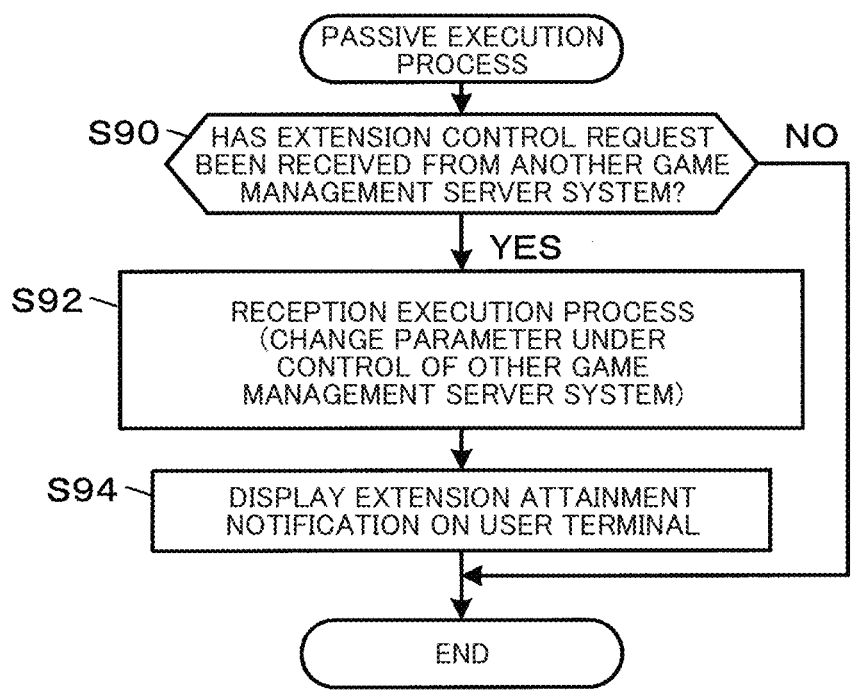
FIG. 9 is a flowchart illustrating the flow of a passive execution process.

FIG. 9 is a flowchart illustrating the flow of the passive execution process. The passive execution process is performed by the second game management server control section 240. When an extension control request has been received from another game management server system (first game management server control section 210 and first game management server system 1115) (YES in step S90), the second game management server control section 240 changes the parameter under control of the other game management server system (step S92). In the first embodiment, the remaining AP 544 is incremented by the designated increment width (change width) to recover the action points AP.

The second game management server control section 240 displays the extension attainment notification W14 (see FIG. 3) on the user terminal 1500 (step S94), and terminates the passive execution process.

According to the first embodiment, it is possible to implement a novel function that extends the progress of the first game played by one player to the progress of the second game played by the friend user that is asynchronous with the first game (i.e., the progress of the first game played by one player affects the progress of the second game played by the friend user).

More specifically, when the progress of the first game played by one player has changed to be advantageous to the player due to the use of the AP recovery item or the like, and the change in the progress of the first game has been detected, the parameter in the first game is incremented (e.g., the action points AP are recovered). The parameter in the second game played by the friend user is also incremented (e.g., the action points AP are recovered) through the extension control process. The activation notification W12 that notifies to that effect is displayed on the user terminal 1500 of the player who plays the first game. The extension attainment notification W14 is displayed on the user terminal 1500 of the friend user. This makes it possible to allow one user and a related user to perceive each other's presence to prompt the users to communicate with each other and feel a sense of solidarity.

When the element that achieves the extension effect is an item (e.g., AP recovery item) that can be purchased by paying virtual money, the player determines that the item can also be used for the friend (i.e., the item is a good deal), and it is possible to prompt the player to purchase the item.

Since the parameter increment width in the second game is basically set to be equal to or smaller than the parameter increment width in the first game, a situation in which the game balance of the second game is unnecessarily impaired does not occur.

Although an example in which the progress of the first game is extended to the progress of the second game has been described above, the progress of the second game can also be extended to the progress of the first game since the first game management server control section 210 and the second game management server control section 240 have an identical functional configuration. Specifically, the second game management server control section 240 may perform the process illustrated in FIG. 8 in which the first game and the second game are replaced by each other, and the first game management server control 210 may perform the process illustrated in FIG. 9. The progress of the second game can thus be extended to the progress of the first game.

Although an example in which the progress of the first game is extended to only the progress of the second game has been described above, the progress of the first game may also be extended to an additional game such as a third game and a fourth game. In the first embodiment, the first game and the second game may be an identical game.

Second Embodiment

A second embodiment to which the invention is applied is described below.

The configuration according to the second embodiment is basically the same as the configuration according to the first embodiment, but differs from the configuration according to the first embodiment in that the parameter in the second game is changed by the program that executes the second game instead of the program that executes the first game. The same elements as those described above in connection with the first embodiment are represented by the same reference signs, and description thereof is omitted.

Figure 10:
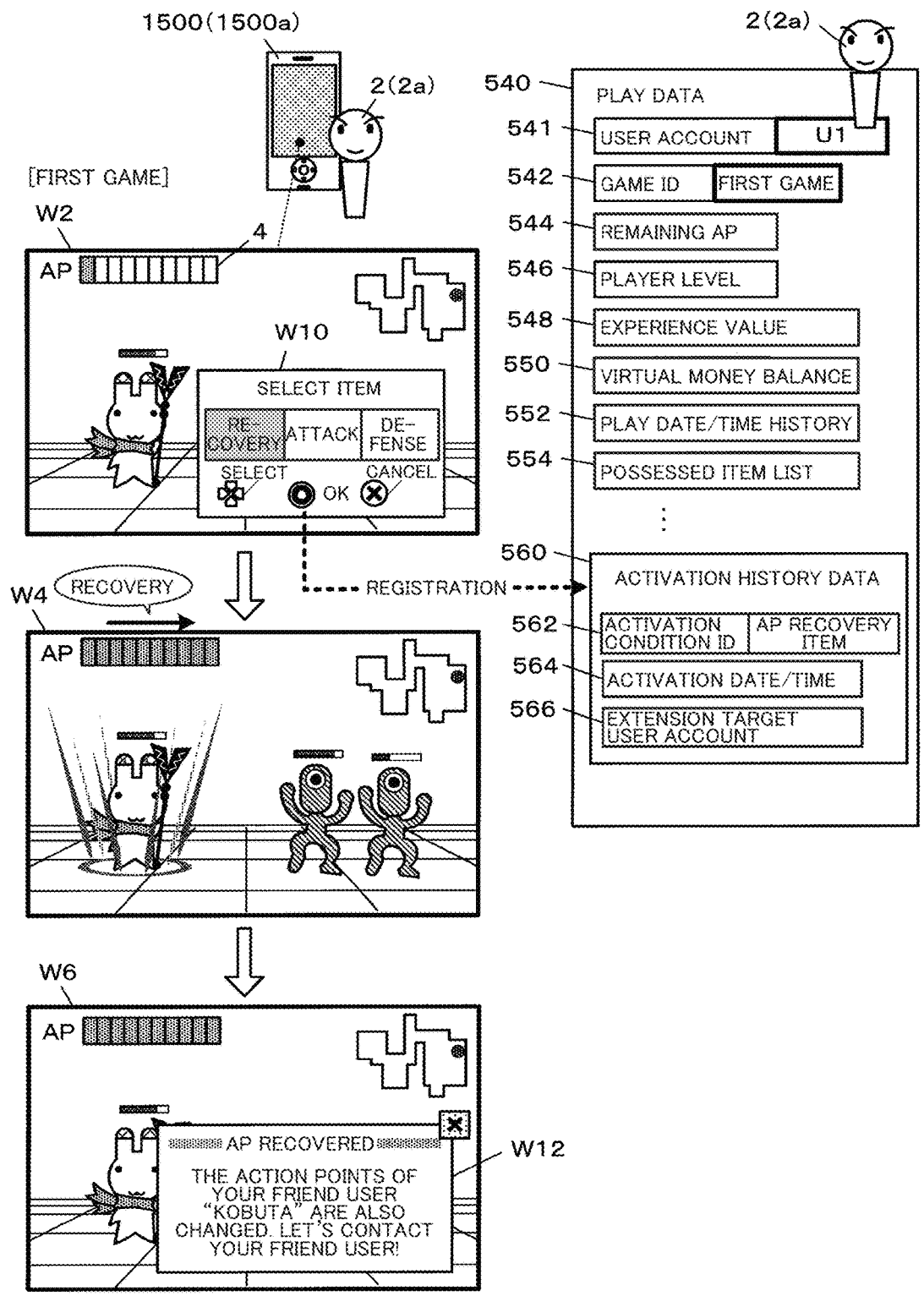
FIG. 10 is a view illustrating a parameter change extension effect according to a second embodiment that is applied to asynchronous games.
Figure 11:
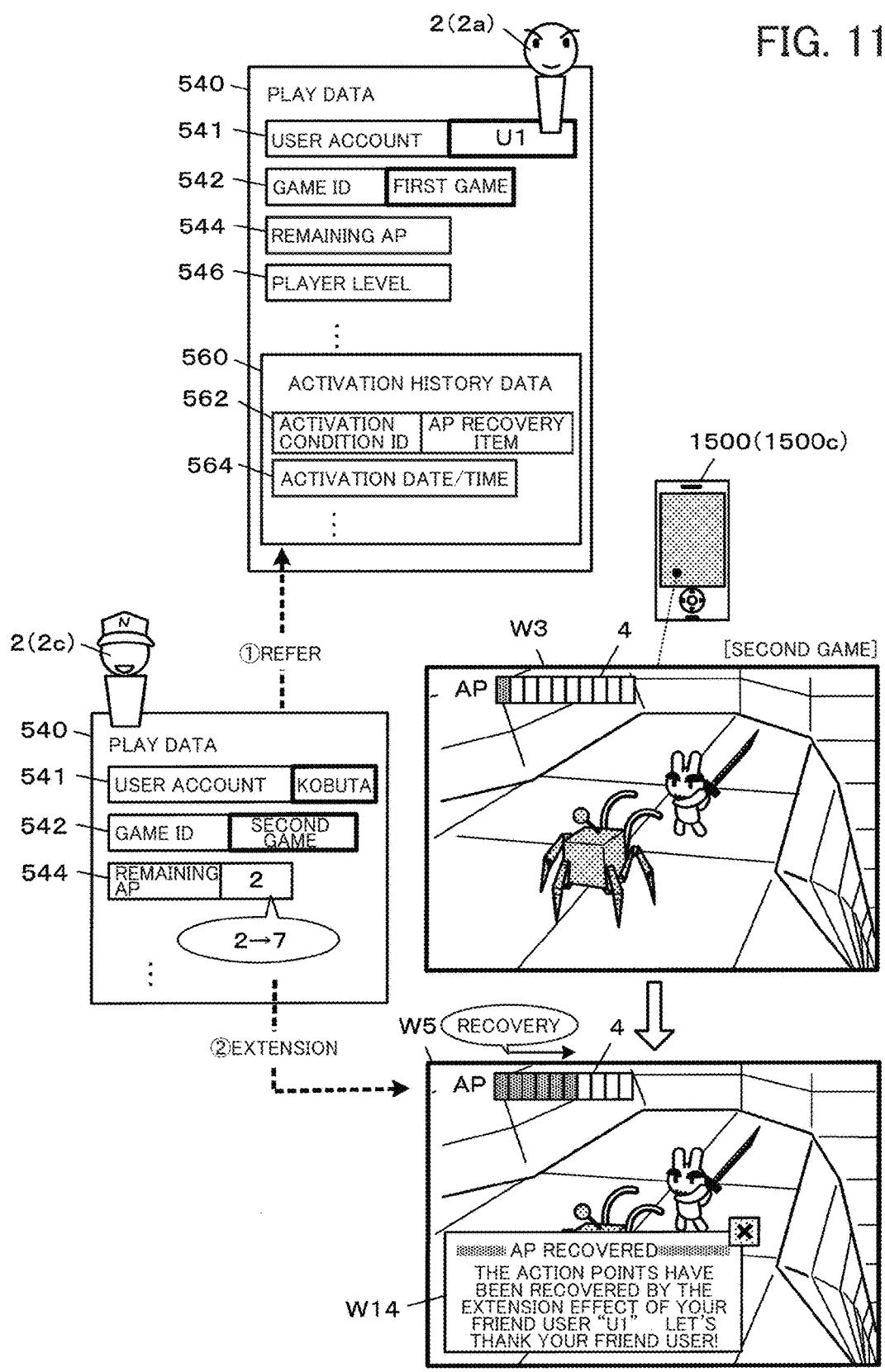
FIG. 11 is a view illustrating a parameter change extension effect according to the second embodiment that is applied to asynchronous games.

FIGS. 10 and 11 are views illustrating the parameter change extension effect according to the second embodiment that is applied to asynchronous games.

The first game management server control section 210 according to the second embodiment does not change the parameter included in the game play data 540 relating to the second game, differing from the first game management server control section 210 according to the first embodiment. As illustrated in FIG. 10, the first game management server control section 210 according to the second embodiment that controls the process of the first game registers activation history data 560 in the play data 540 of the user 2 (2*a*) when the activation condition whereby the extension effect is effected has been satisfied during the first game played by the user 2 (2*a*).

The activation history data 560 includes an activation condition ID 562, an activation date/time 564, and an extension target user account 566, for example. The activation condition ID 562 represents the type of item used as the activation element, an attack target character ID, or the like. In the second embodiment, the AP recovery item is used as the activation element in the same manner as in the first embodiment. The activation date/time 564 represents the date/time when the activation condition was satisfied. The extension target user account 566 represents a list of the user account of each friend user selected as the extension target.

As illustrated in FIG. 11, when the friend user 2(2c) has started to play the second game, the second game management server control section 240 that controls the process of the second game refers to the play data 540 of the friend user (including the user 2 (2a) who plays the first game) of the friend user 2 (2c) when the game has started. The play data may be acquired from another game management server control section.

When the activation history data 560 is included in the play data 540, and the friend user 2 (2c) is registered in the extension target user account 566 (see FIG. 10), the second game management server control section 240 changes the parameter in the second game corresponding to the activation condition ID 562. In the second embodiment, the remaining AP 544 is recovered. Specifically, the extension control process is implemented.

When changing the parameter in the second game, the second game management server control section 240 changes the parameter change amount corresponding to the elapsed time from the time represented by the activation date/time 564 included in the activation history data 560 relating to the first game.

For example, when the elapsed time is within a given full extension reference time (e.g., 30 minutes), the parameter in the second game is changed using 100% of the increment width (change width) corresponding to the activation condition ID 562. When the elapsed time has exceeded the full extension reference time, the parameter in the second game is changed using a value obtained by decrementing the increment width (change width) corresponding to the activation condition ID 562 by the excess. When an extension stop reference time (e.g., 24 hours) has been exceeded, the parameter change extension process on the asynchronous games is skipped (i.e., the extension effect is disabled).

Figure 12:
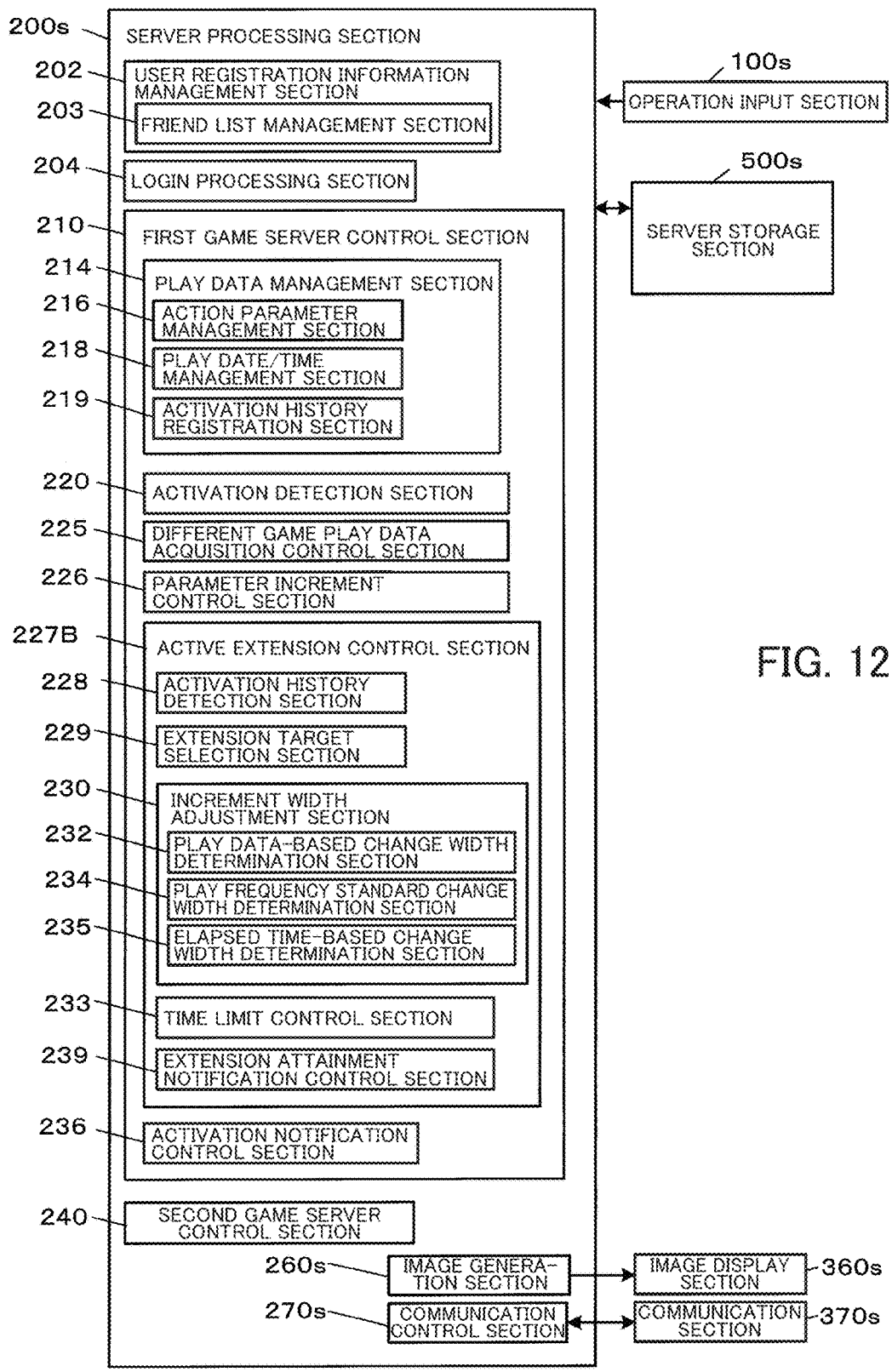
FIG. 12 is a functional block diagram illustrating an example of the functional configuration of a server system according to the second embodiment.

FIG. 12 is a functional block diagram illustrating an example of the functional configuration of the server system 1100 according to the second embodiment. The functional configuration of the server system 1100 according to the second embodiment is basically the same as the functional configuration of the server system 1100 according to first embodiment, but differs from the functional configuration of the server system 1100 according to first embodiment as to the following points.

The friend list management section 203 according to the second embodiment performs the friend registration process through agreement between the users. Specifically, when the first user desires to register the second user as a friend, the friend list management section 203 asks the second user whether or not to agree with registration as a friend. When the second user has agreed with registration as a friend, the second user is registered in the friend list 525 of the first user, and the first user is registered in the friend list 525 of the second user.

The play data management section 214 according to the second embodiment includes an activation history registration section 219. The activation history registration section 219 registers the activation history data 560 (see FIG. 10) in the play data 540 of the player when the activation detection section 220 has detected that the activation condition has been satisfied.

In the second embodiment, a different game play data acquisition control section 225 is provided instead of the second game data acquisition control section 222 and the second game play date/time acquisition control section 224 according to the first embodiment. The different game play data acquisition control section 225 performs a control process for acquiring or referring to the play data 540 relating to a different game (i.e., the first game for the second game management server control section 240, or the second game for the first game management server control section 210).

In the second embodiment, an active extension control section 227B is provided instead of the extension control section 227 according to the first embodiment.

The active extension control section 227B includes an activation history detection section 228. The active extension control section 227B detects the activation history data 560 from the play data 540 of the friend user that can be acquired or referred to by the different game play data acquisition control section 225 using the activation history detection section 228. When the activation history data 560 is present, the active extension control section 227B changes the parameter in the game by the increment width determined by the increment width adjustment section 230.

The increment width adjustment section 230 according to the second embodiment includes an elapsed time-based change width determination section 235 that determines the increment width (change width) applied when changing the parameter in the game corresponding to the elapsed time from the timing at which the activation condition has been satisfied in a different game.

In the second embodiment, the passive execution control section 238 is omitted, and an extension attainment notification control section 239 is included in the active extension control section 227B.

The second game management server control section 240 has the same functional configuration as that of the first game management server control section 210 in the same manner as in the first embodiment.

The flow of the process performed by the second game management server control section 240 according to the second embodiment is described below. Since the first game management server control section 210 has the same functional configuration as that of the second game management server control section 240, the flow of the process performed by the first game management server control section 210 may be the same as described below.

Figure 13:
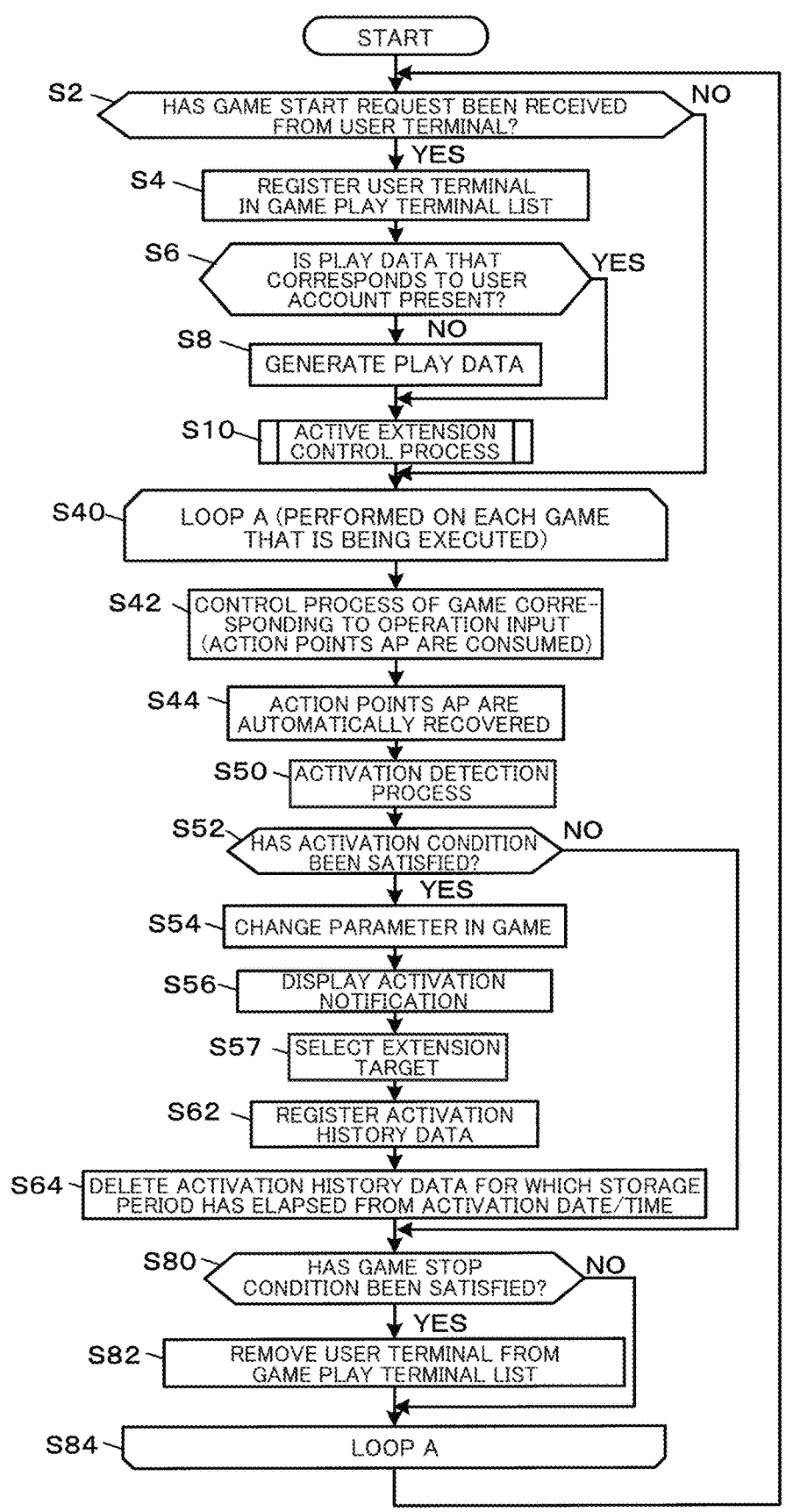
FIG. 13 is a flowchart illustrating the flow of a parameter change extension process according to the second embodiment that is applied to asynchronous games.

FIG. 13 is a flowchart illustrating the flow of the process performed by the second game management server control section 240 according to the second embodiment. The flow of the process performed by the second game management server control section 240 according to the second embodiment is basically the same as described above in connection with the first embodiment. In the second embodiment, the second game management server control section 240 performs the active extension control process before performing the loop A process (i.e., before starting the game) (step S10).

Figure 14:
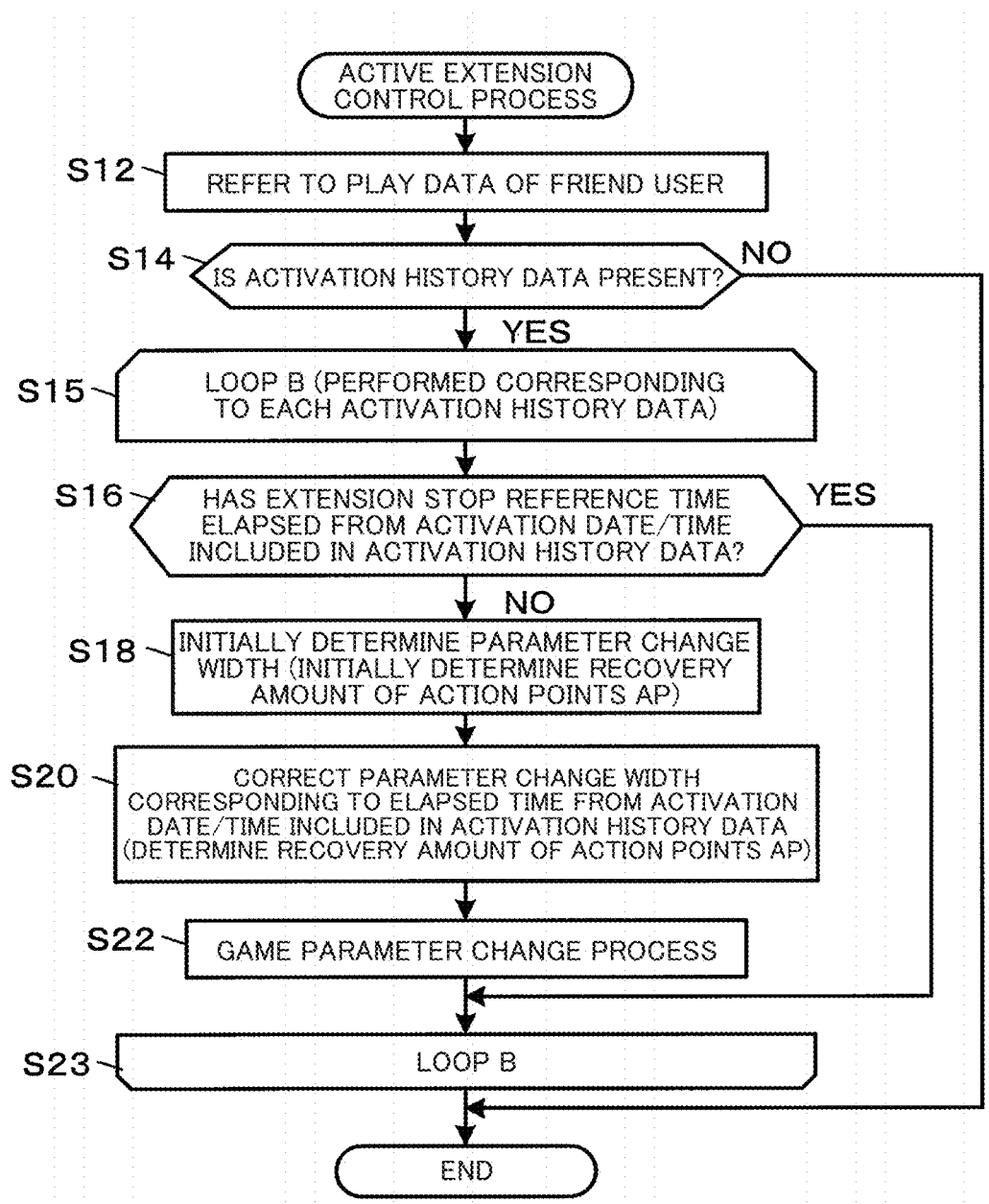
FIG. 14 is a flowchart illustrating the flow of an active extension control process.

FIG. 14 is a flowchart illustrating the flow of the active extension control process.

The second game management server control section 240 acquires or refers to the play data 540 of the friend user of the player of the user terminal 1500 that has transmitted a game start request (step S12), and determines whether or not the activation history data 560 is included in the play data 540 (step S14).

When the activation history data 560 is included in the play data 540 (YES in step S14), the second game management server control section 240 performs a loop B process corresponding to each activation history data 560 (steps S15 to S23).

In the loop B process, the second game management server control section 240 calculates the elapsed time from the activation date/time 564 included in the activation history data 560 subjected to the loop B process, and determines whether or not a given extension stop reference time has elapsed (step S16). When the extension stop reference time has not elapsed (NO in step S16), the second game management server control section 240 initially determines the increment width (change width) of the parameter (step S18). Specifically, the second game management server control section 240 determines the increment width (change width) based on the player level 546, the experience value 548, the virtual money balance 550, the play frequency calculated from the play date/time history 552, or the like so that the increment width (change width) increases as the player level 546 or the like increases.

The second game management server control section 240 corrects the increment width (change width) corresponding to the elapsed time from the activation date/time 564 included in the activation history data 560 (step S20), changes the parameter in the game by the corrected increment width (change width) (step S22), and terminates the loop B process (step S23).

When the loop B process has been performed on each activation history data 560 included in the play data 540 of the friend user, the second game management server control section 240 terminates the active extension control process.

Again referring to FIG. 13, when it has been detected that the activation condition has been satisfied during the game, the activation history data 560 is registered in the game play data 540 of the player (step S62), and the activation history data 560 for which a given storage period has elapsed from the activation date/time 564 is deleted (step S64) instead of performing the steps S58 and S60 described above in connection with the first embodiment.

MODIFICATIONS

The first embodiment and the second embodiment to which the invention is applied have been described above. Note that the invention is not limited thereto. Various modifications may be appropriately made, such as adding other elements, omitting some of the elements, or changing some of the elements.

In the second embodiment, the activation history data 560 is stored in the play data 540. Note that the activation history data 560 may be stored in the user registration data 520 (see FIG. 5). In this case, the user registration data 520 is referred to in the step S12 of the active extension control process (see FIG. 14).

When the activation history data 560 according to the second embodiment is used in the first embodiment, the extension control section 227 functions as a temporary change means that performs a control process that temporarily changes the second parameter of the player for a given period. In this case, the parameter in the second game is changed by temporarily incrementing the capability value, the win probability applied in connection with the game, or the like.

Figure 15:
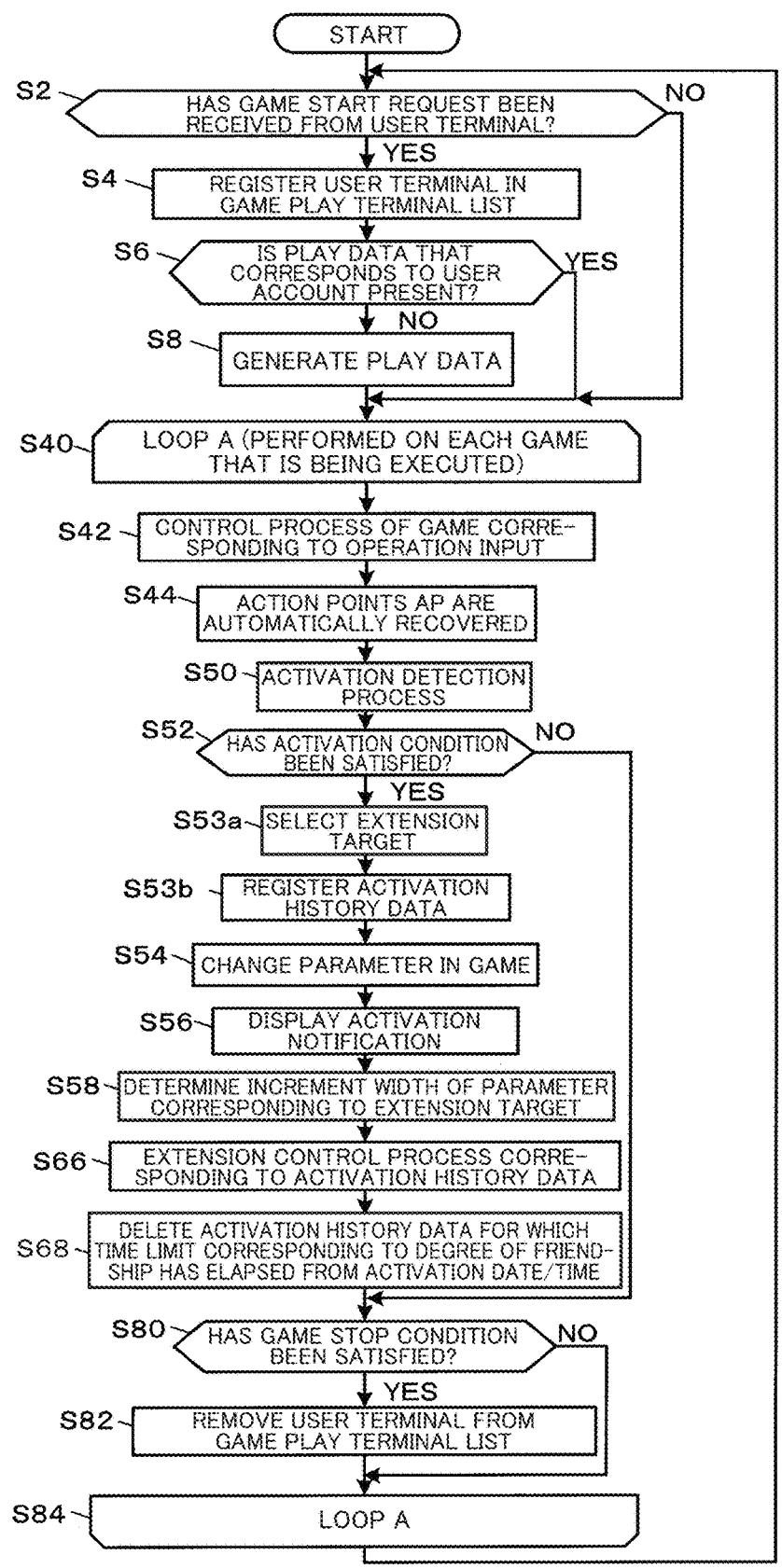
FIG. 15 is a flowchart illustrating the flow of a parameter change extension process according to a modification that is applied to asynchronous games.

As illustrated in FIG. 15 (flowchart), after the step S52 (see the first embodiment) has been performed, the first game management server control section 210 selects the extension target (step S53a (corresponding to the step S57 in the first embodiment)), and registers the activation history data 560 (step S53b). After the step S58 has been performed, the extension control process is performed corresponding to the registered activation history data 560 (step S66) instead of performing the step S60 in the first embodiment. Specifically, when the activation history data 560 is present, the capability value, the win probability applied in connection with the game, or the like is incremented. When a given time has elapsed from the activation date/time 564 included in the activation history data 560, the capability value, the win probability, or the like is returned to the initial value. The first game management server control section 210 deletes the activation history data 560 for which a time limit corresponding to the degree of friendship 525b has elapsed from the activation date/time 564 (step S68). Therefore, the second parameter (e.g., capability value or win probability) is not changed during the next loop A process when a given time has elapsed from the activation date/time.

The time limit used in the step S68 may preferably be derived using a given function or the like so that the time limit increases as the degree of friendship 525b (see FIG. 6) between the player of the game subjected to the loop A process and the extension target friend user increases.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A server system that asynchronously controls a process of a game played by each player on external devices, the server system comprising:
    at least one microprocessor; and
    a communication section that communicates with an external device;
    the at least one microprocessor is configured to
        change by a parameter change control section, a parameter of a first player when a given activation condition has been satisfied, the activation condition being a condition whereby a process that changes the parameter of the first player is performed;
        perform, by an extension control section, an extension control process that changes a parameter of a second player who relates to the first player when the second player has logged in after the activation condition has been satisfied;
        receive, over the communication section from the external device, an indication that the second player logs in; and
        adjust, by a change width adjustment section, responsive to receipt of the indication that the second player logs in, a change width of the parameter of the second player that is changed by the extension control process corresponding to an elapsed time until the second player logs in after the activation condition has been satisfied.

2. The server system as defined in claim 1,
    the at least one microprocessor is further configured to determine that the activation condition is satisfied in response to an instruction operation input by the first player for using a given item or implementing a given action.

3. The server system as defined in claim 1,
    the at least one microprocessor is further configured to determine that the activation condition is satisfied in response to the process of the game played by the first player having satisfied a given condition.

4. The server system as defined in claim 1,
the change width adjustment section of the at least one microprocessor is further configured to adjust the change width of the parameter of the second player to be smaller than a change width of the parameter of the first player that is changed by the parameter change control section.

5. The server system as defined in claim 1,
the change width adjustment section of the at least one microprocessor is further configured to change the change width of the parameter of the second player using a degree of friendship between the first player and the second player.

6. The server system as defined in claim 1,
the change width adjustment section of the at least one microprocessor is further configured to change the change width of the parameter of the second player using a number of the second players.

7. The server system as defined in claim 1,
the extension control section of the at least one microprocessor is further configured to temporarily change, by a time limit control section, the parameter of the second player for a given period, in response to the activation condition being satisfied.

8. The server system as defined in claim 7,
the time limit control section of the at least one microprocessor is further configured to change a time limit up to which the parameter of the second player is changed, using a degree of friendship between the first player and the second player.

9. The server system as defined in claim 1, wherein the at least one microprocessor is further configured to:
select, by an extension target selection section, an extension target player, the extension target player being a related player among a plurality of related players of the first player that is subjected to the extension control process performed by the extension control section,
the extension control section is further configured to perform the extension control process on the extension target player selected by the extension target selection section as the second player.

10. The server system as defined in claim 9,
the extension target selection section of the at least one microprocessor is further configured to select the extension target player using a degree of friendship between the first player and the related player.

11. The server system of claim 1, wherein the at least one microprocessor is further configured to
control an external device on which a first game is played by the first player, to display an activation notification announcing that the parameter of the second player is adjusted; and
control an external device on which a second game is played by the second player, wherein the process of the first game and the process of the second game are controlled asynchronously by the server system, to display an extension attainment notification announcing that the parameter of the second player is adjusted.

12. A method, implemented on a server, for controlling a computer system that asynchronously controls a process of a game played by each player on external devices, the method comprising:
at the server,
changing a parameter of a first player when a given activation condition has been satisfied, the activation condition being a condition whereby a process that changes the parameter of the first player is performed;
performing an extension control process that changes a parameter of a second player who relates to the first player when the second player has logged in after the activation condition has been satisfied;
receiving, over a communication section of the server, from the external device, an indication that the second player loss in; and
responsive to receipt of the indication that the second player logs in, adjusting a change width of the parameter of the second player that is changed by the extension control process corresponding to an elapsed time until the second player logs in after the activation condition has been satisfied.

13. A network game system, the network game system comprising external player devices and a server system that is connected to the external player devices via a communication network, the server system asynchronously controls a process of a game played by each player on the external player devices, the server system comprising:
at least one microprocessor; and
a communication section that communicates with an external player device;
the at least one microprocessor is configured to
change, by a parameter change control section, a parameter of a first player on a first external player device when a given activation condition has been satisfied, the activation condition being a condition whereby a process that changes the parameter of the first player is performed, and transmit the parameter that was changed to the first external player device;
perform, by an extension control section, an extension control process that changes a parameter of a second player who relates to the first player when the second player has logged in on a second external player device after the activation condition has been satisfied;
receive, over the communication section from the second external player device, an indication that the second played logs in; and
adjust, by a change width adjustment section, responsive to receipt of the indication that the second player logs in, a change width of the parameter of the second player that is changed by the extension control process corresponding to an elapsed time until the second player logs in after the activation condition has been satisfied, and transmit the parameter that with the adjusted change width to the second external player device.

* * * * *